(12) United States Patent
Kurabayashi et al.

(10) Patent No.: US 12,539,711 B2
(45) Date of Patent: Feb. 3, 2026

(54) LIQUID DISCHARGE APPARATUS, CONTROL METHOD FOR CORRECTING LIQUID DISCHARGE APPARATUS, AND RECORDING MEDIUM

(71) Applicants: Dai Kurabayashi, Kanagawa (JP); Yuichiro Maeyama, Kanagawa (JP); Shingo Takai, Ibaraki (JP); Noboru Hirano, Kanagawa (JP); Yohei Sakon, Kanagawa (JP)

(72) Inventors: Dai Kurabayashi, Kanagawa (JP); Yuichiro Maeyama, Kanagawa (JP); Shingo Takai, Ibaraki (JP); Noboru Hirano, Kanagawa (JP); Yohei Sakon, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 156 days.

(21) Appl. No.: 18/020,270

(22) PCT Filed: Sep. 14, 2021

(86) PCT No.: PCT/JP2021/033700
§ 371 (c)(1),
(2) Date: Feb. 8, 2023

(87) PCT Pub. No.: WO2022/059666
PCT Pub. Date: Mar. 24, 2022

(65) Prior Publication Data
US 2023/0302834 A1  Sep. 28, 2023

(30) Foreign Application Priority Data

Sep. 15, 2020 (JP) ................... 2020-154275
Jul. 28, 2021 (JP) ................... 2021-123609

(51) Int. Cl.
*B41J 29/393* (2006.01)
*G06F 3/12* (2006.01)
(Continued)

(52) U.S. Cl.
CPC .......... *B41J 29/393* (2013.01); *G06F 3/1208* (2013.01); *G06F 3/1256* (2013.01);
(Continued)

(58) Field of Classification Search
CPC .. B41J 29/393; B41J 2025/008; B41J 2/2146; B41J 2/2135; G06F 3/1208;
(Continued)

(56) References Cited

U.S. PATENT DOCUMENTS

2013/0321512 A1  12/2013  Chen et al.
2017/0345124 A1  11/2017  Satoh et al.
(Continued)

FOREIGN PATENT DOCUMENTS

JP  2006-293096  10/2006
JP  2010-210651  9/2010
(Continued)

OTHER PUBLICATIONS

Takahashi Susumu, "Printing Device" (WO 2020059552 A1), Mar. 26, 2020 (Year: 2020).*
(Continued)

*Primary Examiner* — Lisa Solomon
(74) *Attorney, Agent, or Firm* — XSENSUS LLP

(57) ABSTRACT

A liquid discharge apparatus according to an aspect of the present disclosure is a liquid discharge apparatus for forming an image on a recording medium, the liquid discharge apparatus including a first image obtaining unit configured to obtain first image data, a second image generating unit configured to generate second image data by adding a predetermined figure to the first image data, a correcting unit (Continued)

configured to generate third image data obtained by correcting, for each of pages, the first image data, based on the second image data and read image data obtained by reading an image formed on the recording medium based on the second image data, and a liquid discharging unit configured to discharge liquid onto the recording medium, based on the third image data.

13 Claims, 31 Drawing Sheets

(51) Int. Cl.
*H04N 1/00* (2006.01)
*H04N 1/387* (2006.01)

(52) U.S. Cl.
CPC ....... *H04N 1/00819* (2013.01); *H04N 1/3871* (2013.01); *G06F 3/1282* (2013.01)

(58) Field of Classification Search
CPC . G06F 3/1256; G06F 3/1282; H04N 1/00819; H04N 1/3871
See application file for complete search history.

(56) References Cited

U.S. PATENT DOCUMENTS

| | | |
|---|---|---|
| 2020/0021693 A1 | 1/2020 | Kurabayashi |
| 2020/0089150 A1 | 3/2020 | Tokuma et al. |
| 2020/0254782 A1* | 8/2020 | Kawai ................. B65H 7/14 |
| 2021/0146701 A1 | 5/2021 | Maeyama et al. |

FOREIGN PATENT DOCUMENTS

| | | | |
|---|---|---|---|
| JP | 2020-49663 A | 4/2020 | |
| WO | WO-2020059552 A1 * | 3/2020 | ............ B41J 11/008 |

OTHER PUBLICATIONS

International Search Report for PCT/JP2021/033700 mailed on Dec. 8, 2021, 9 pages.

Office Action issued on Apr. 22, 2025 in corresponding Japanese Patent Application No. JP2021-123069.

* cited by examiner

[Fig. 1]
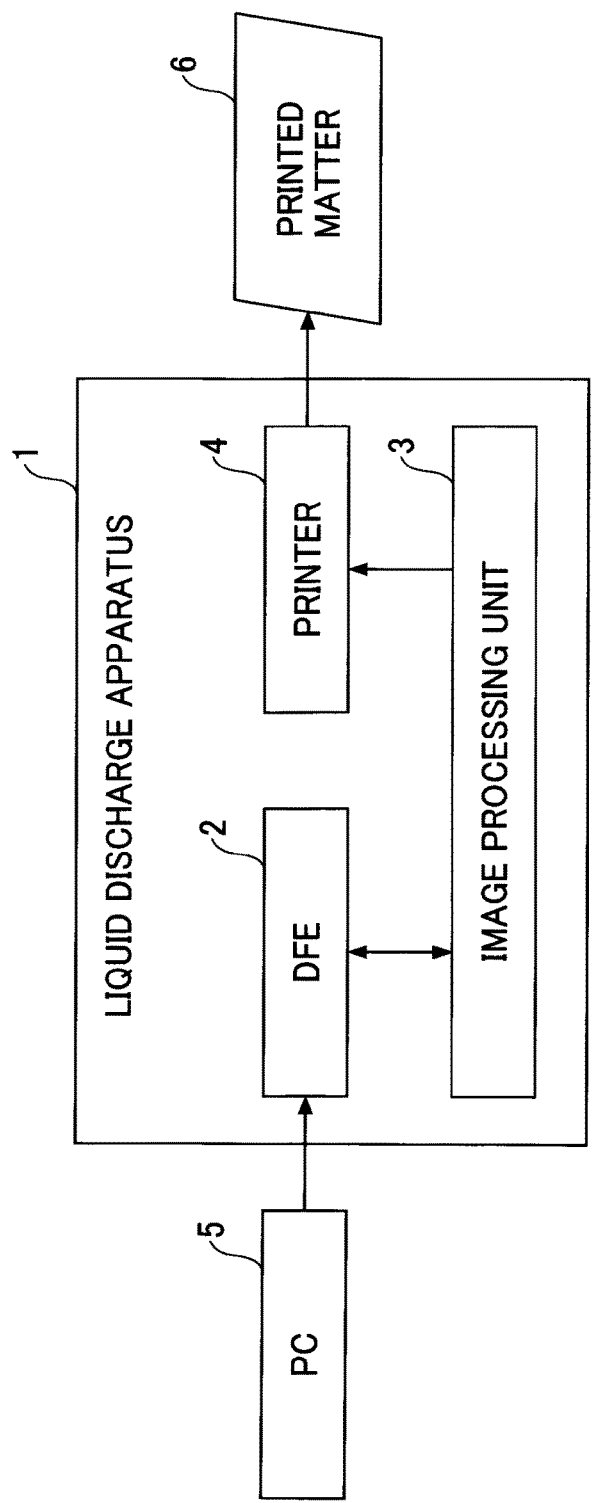

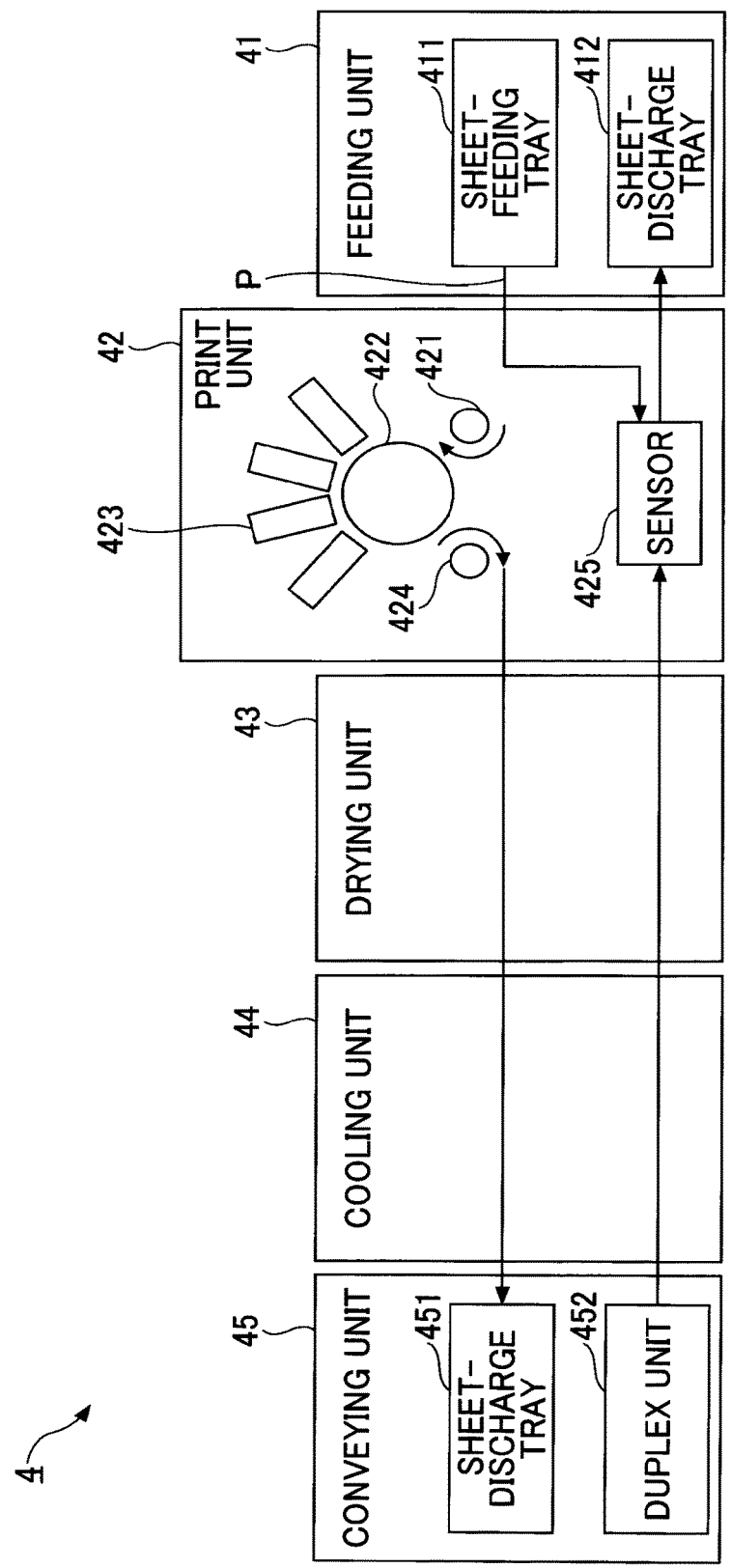

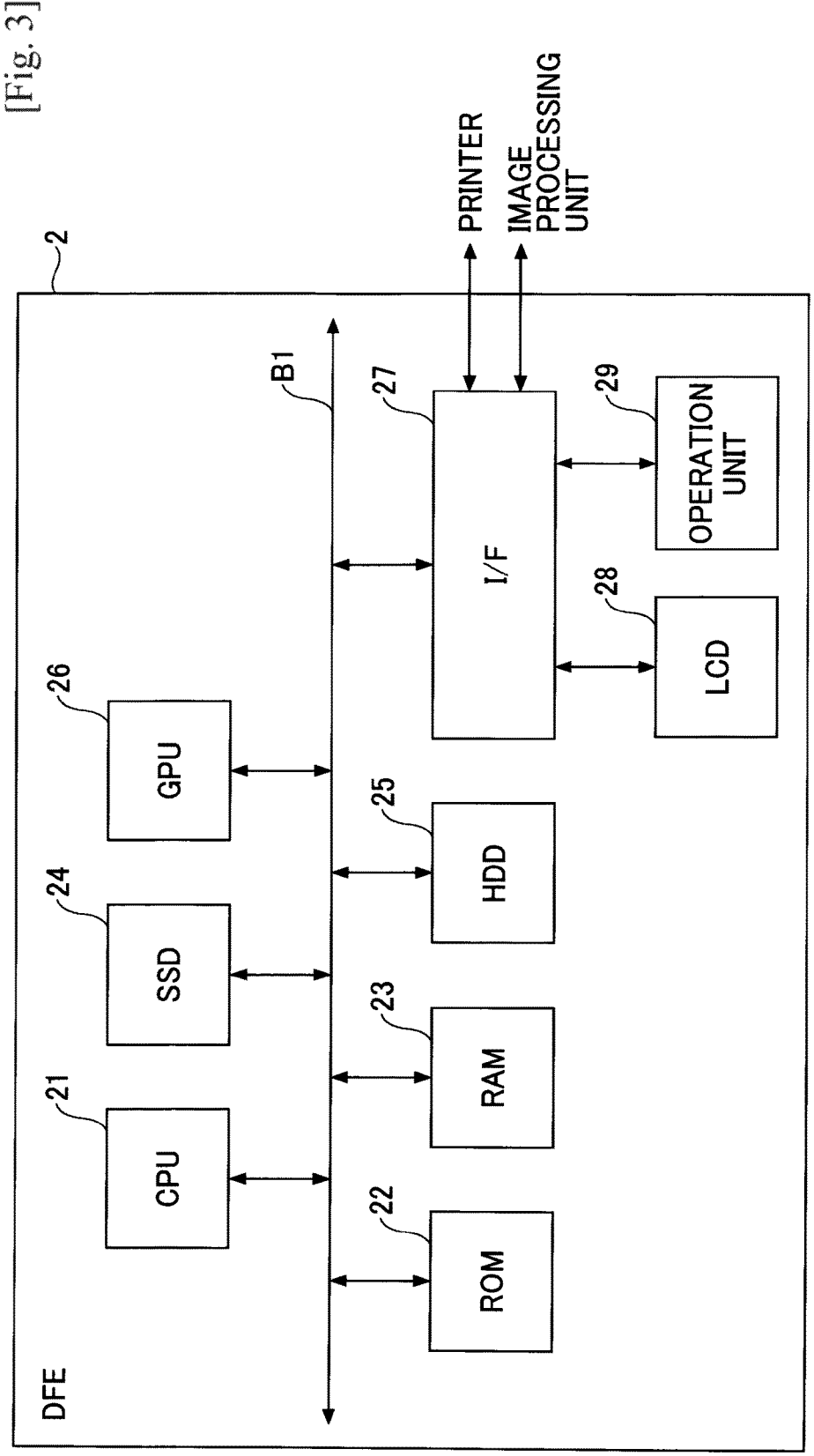
[Fig. 3]

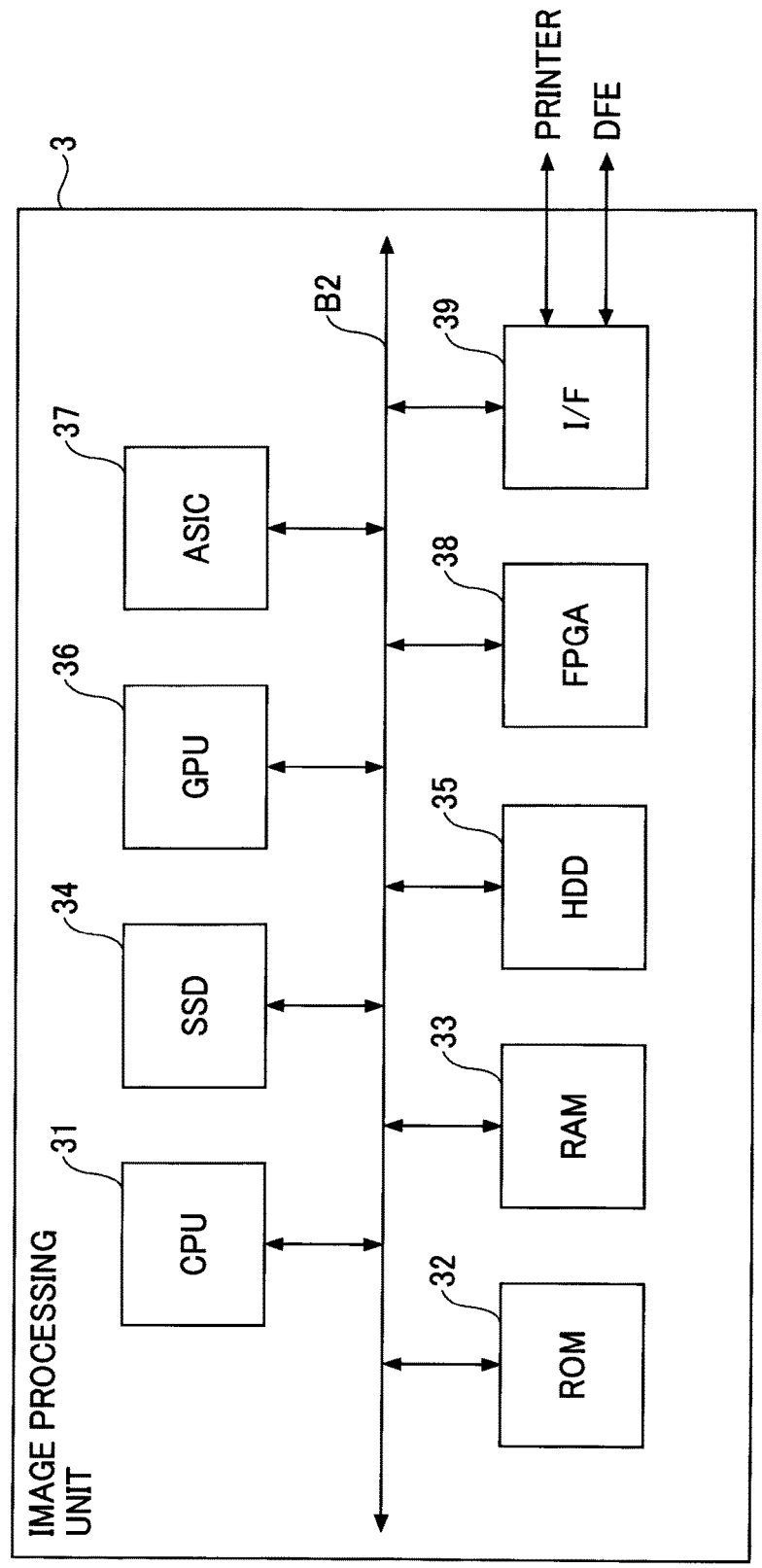
[Fig. 4]

[Fig. 5]
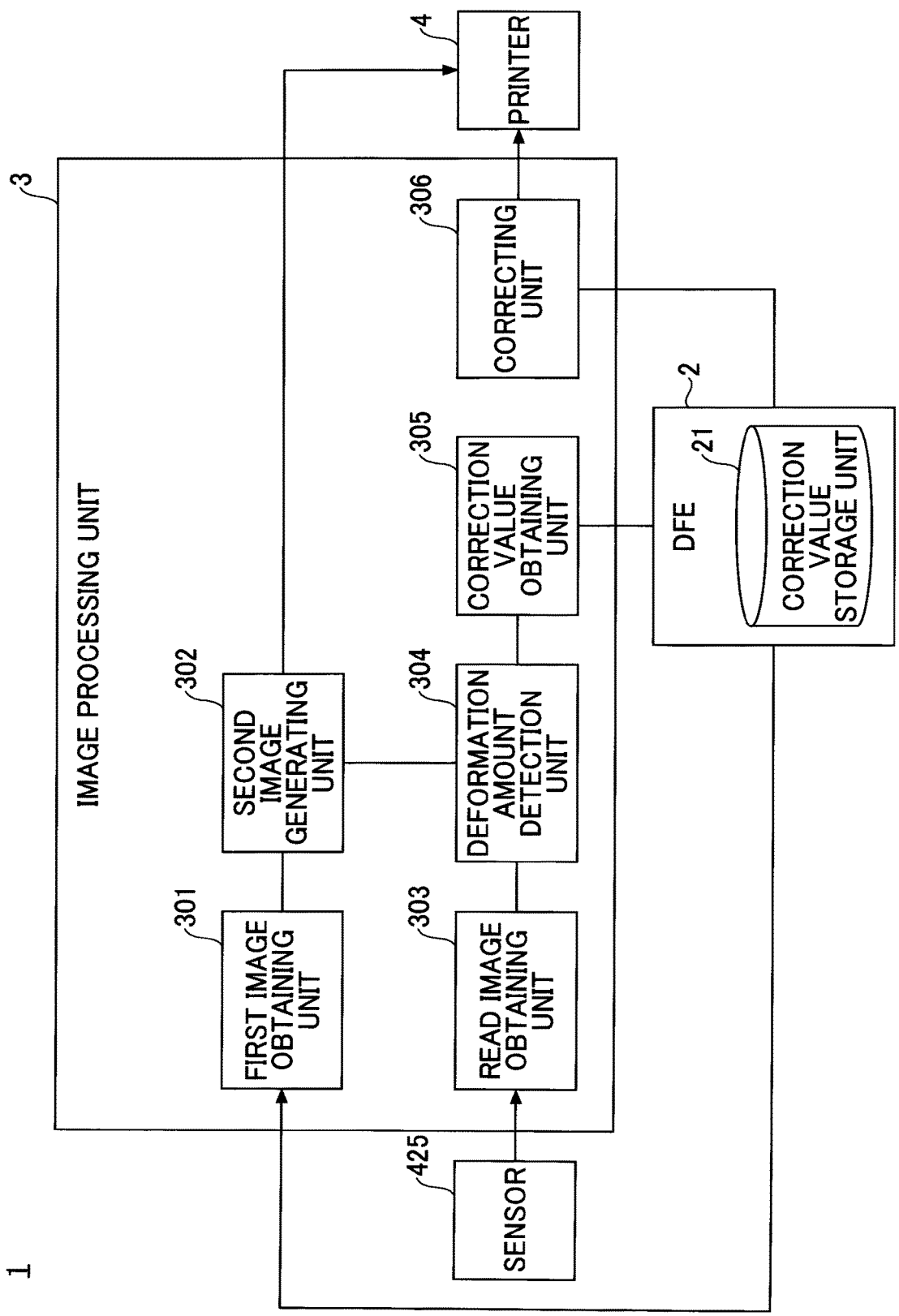

[Fig. 6]
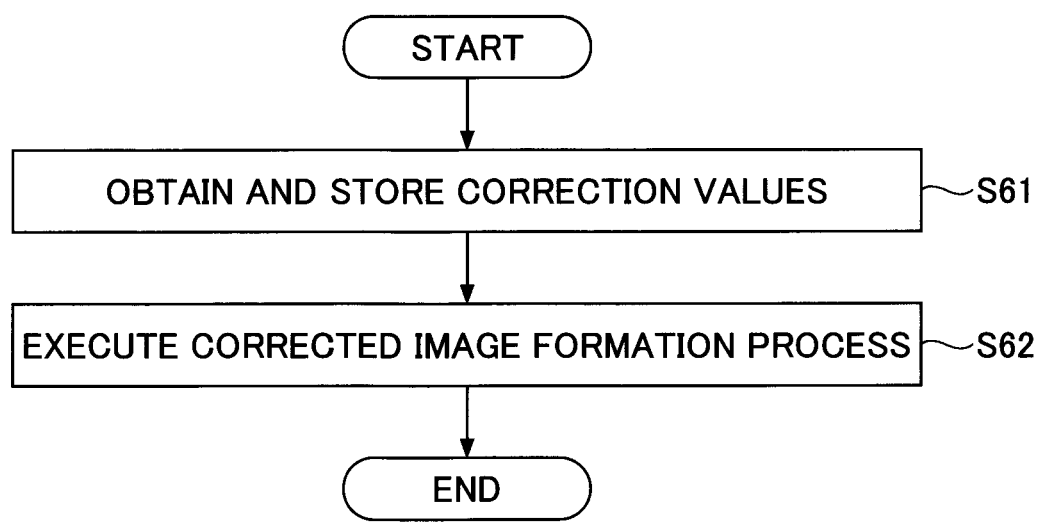

[Fig. 7]
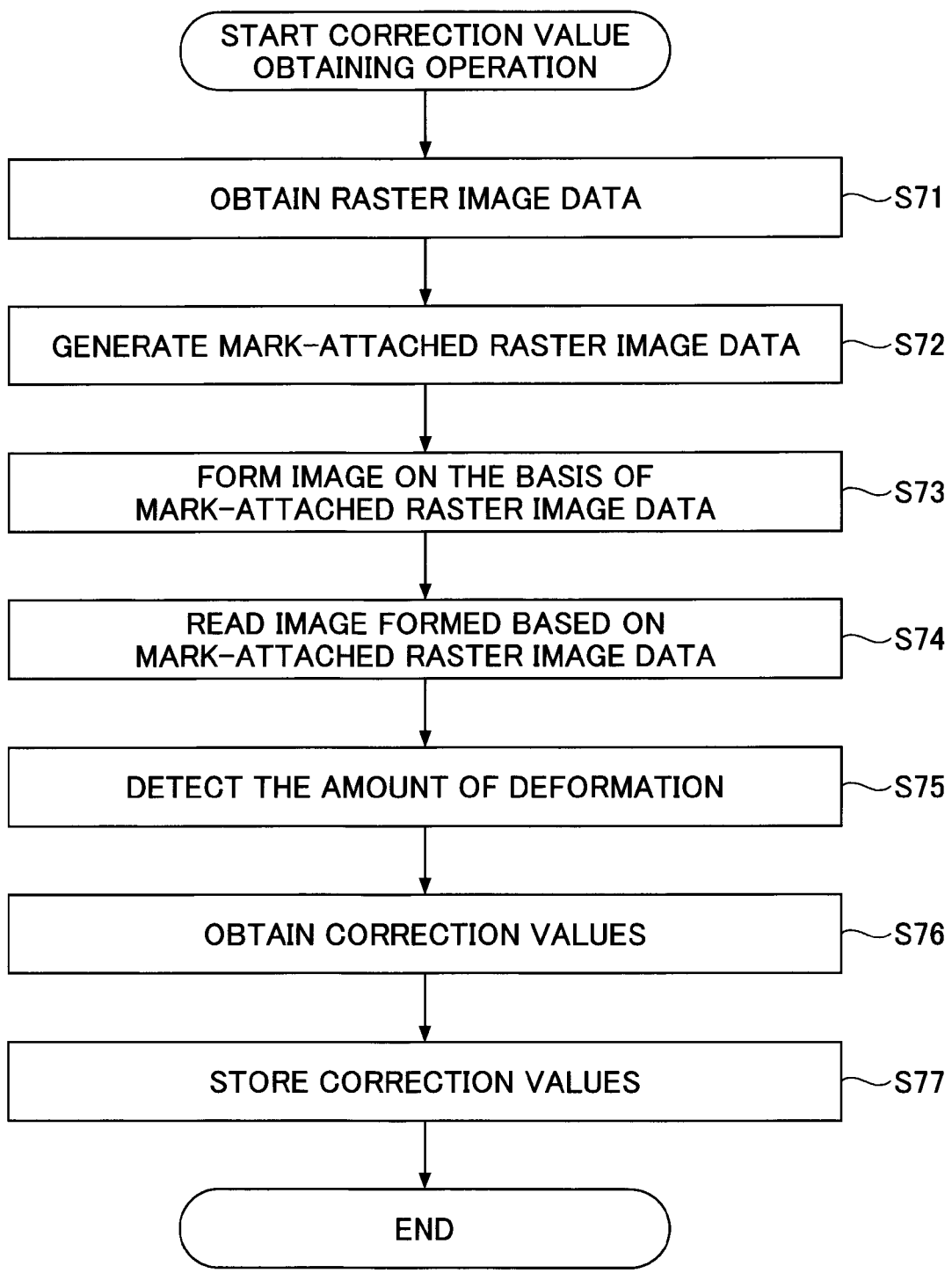

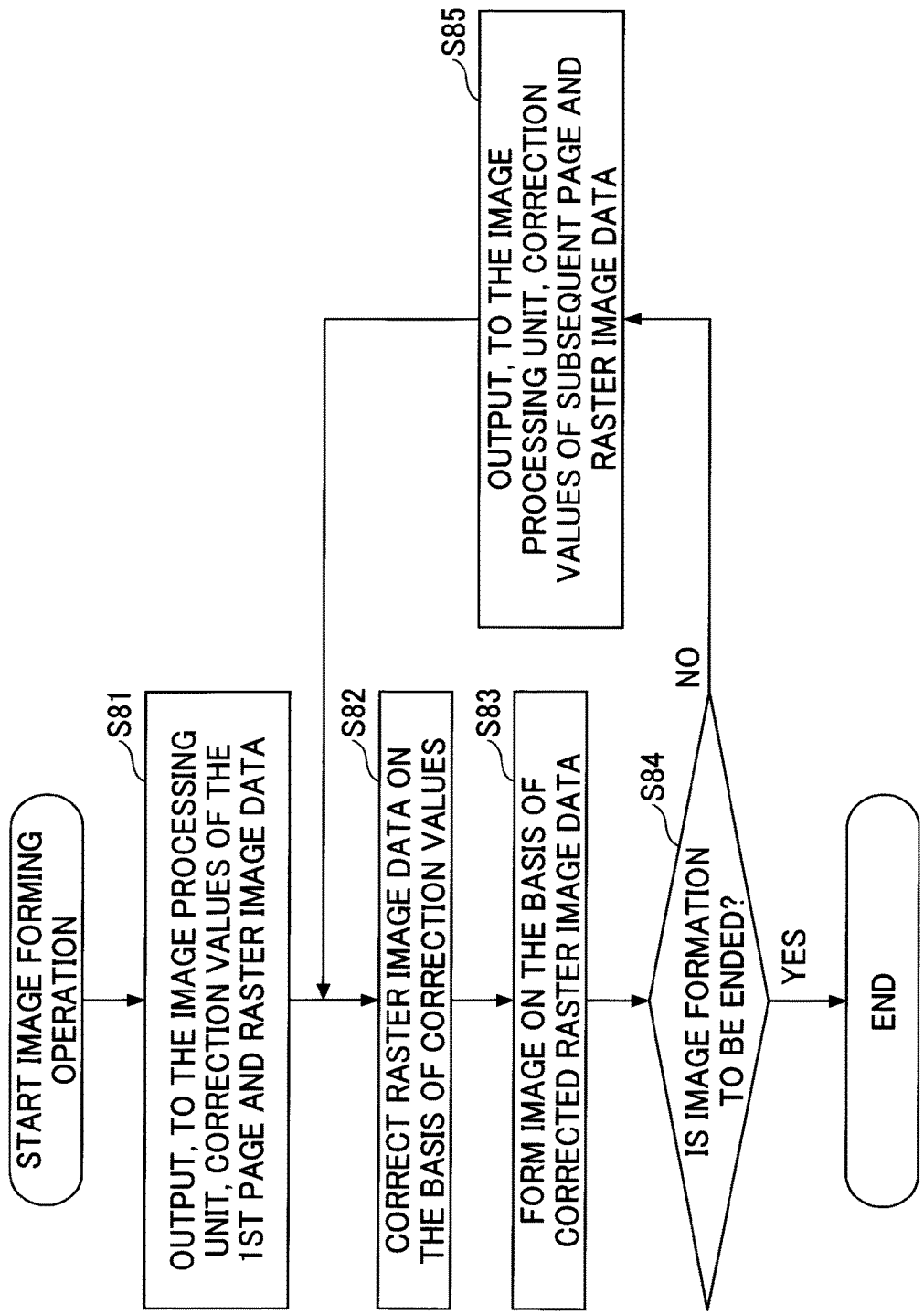
[Fig. 8]

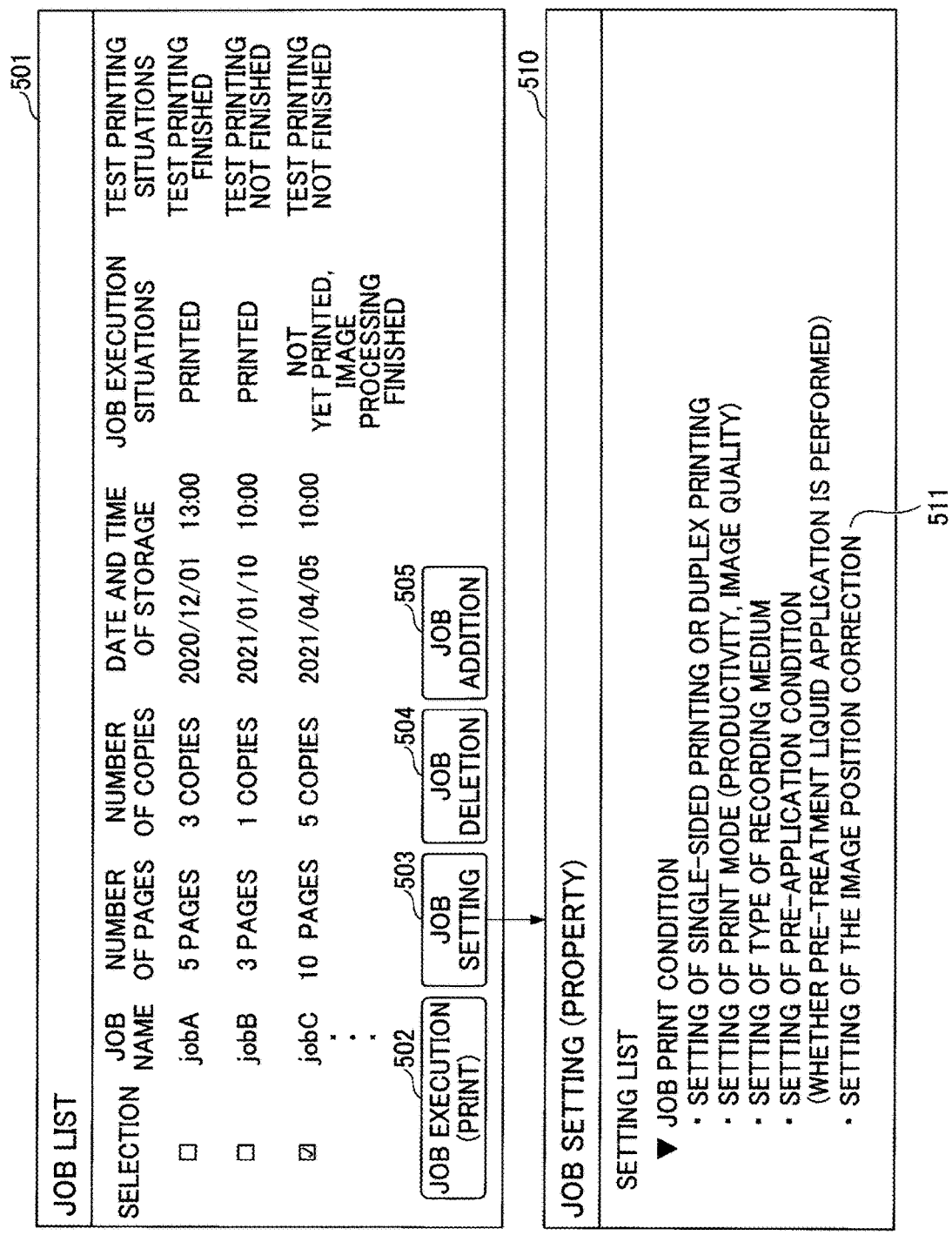

[Fig. 10]
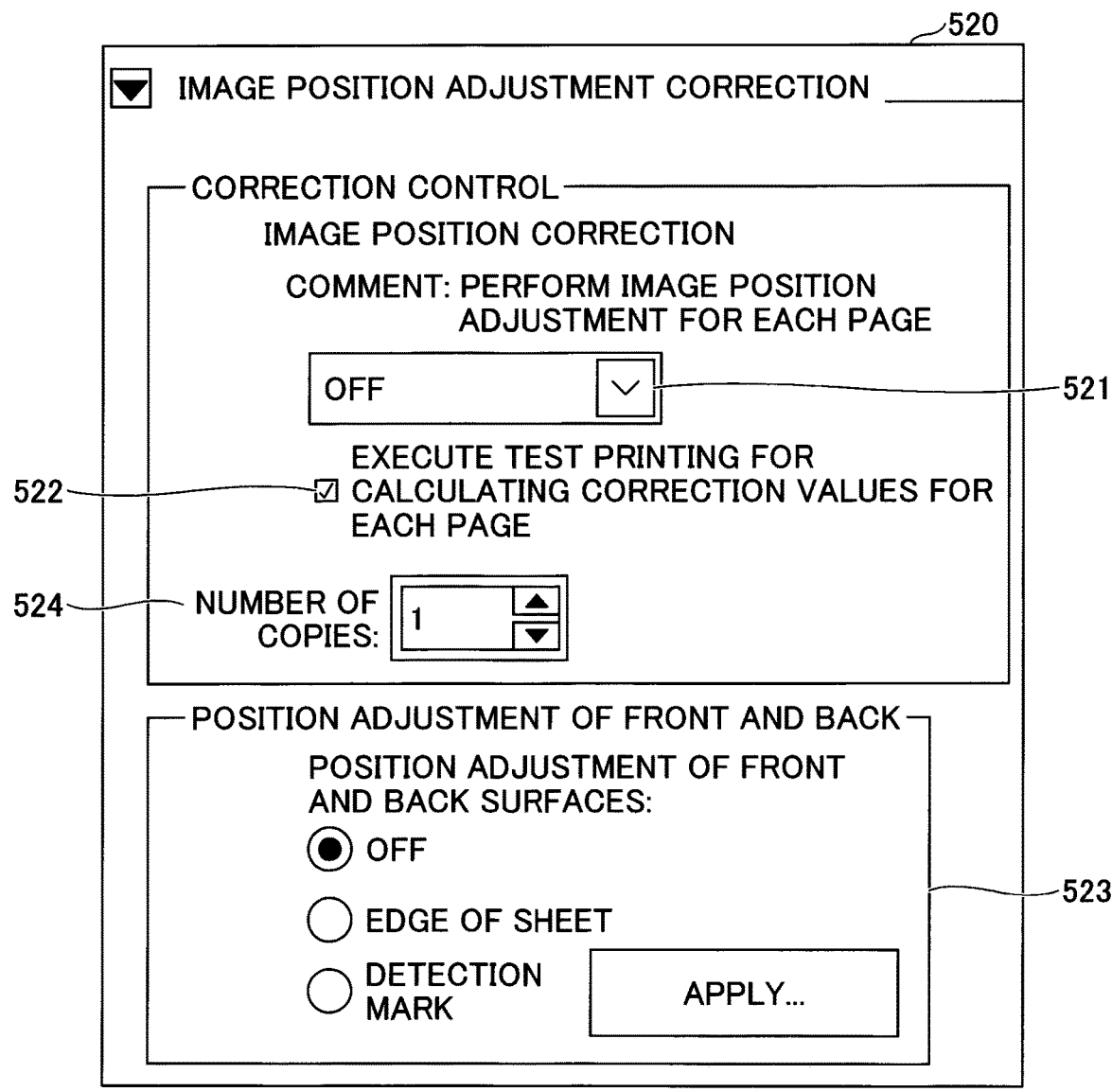

[Fig. 11]
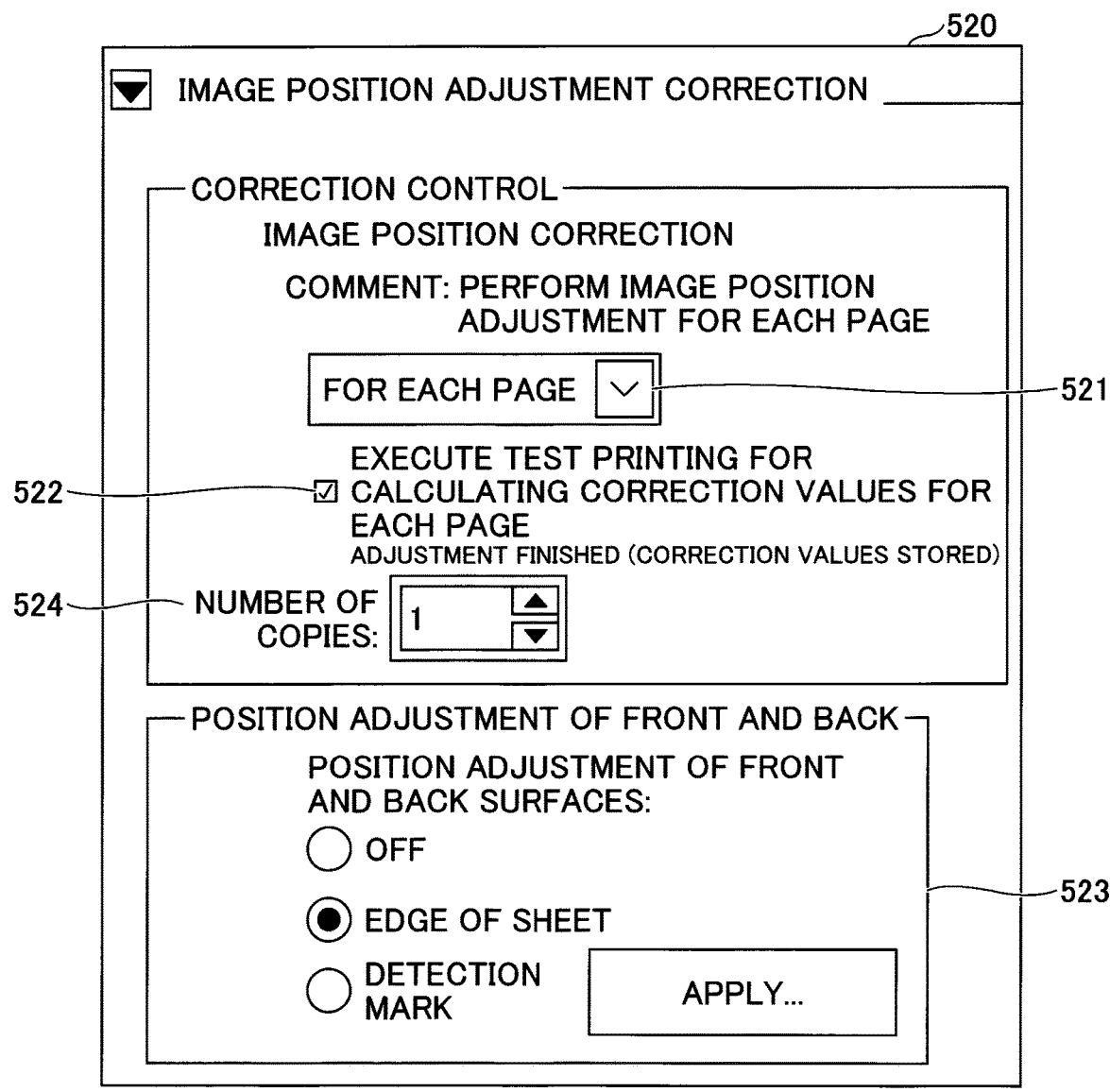

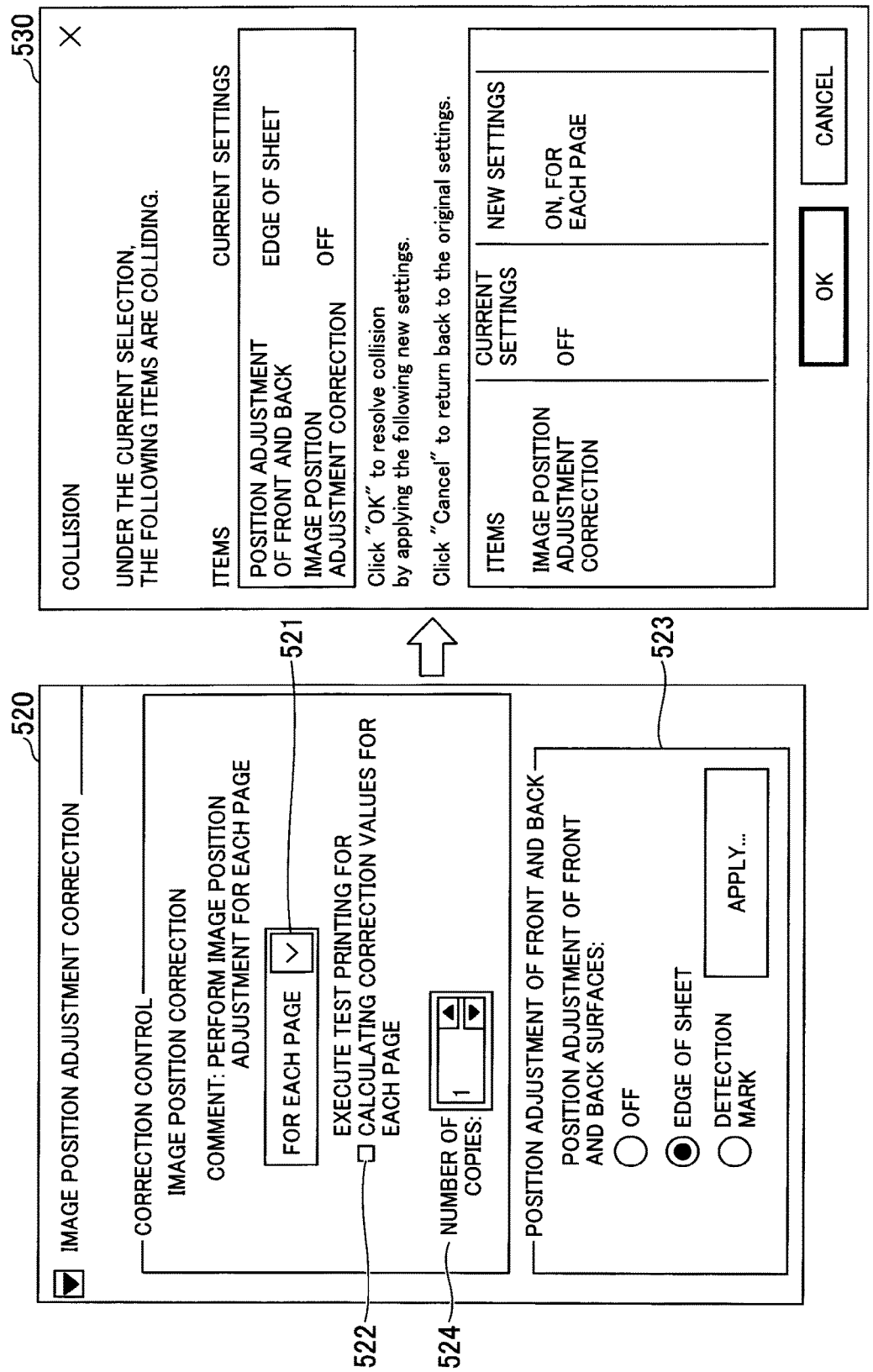

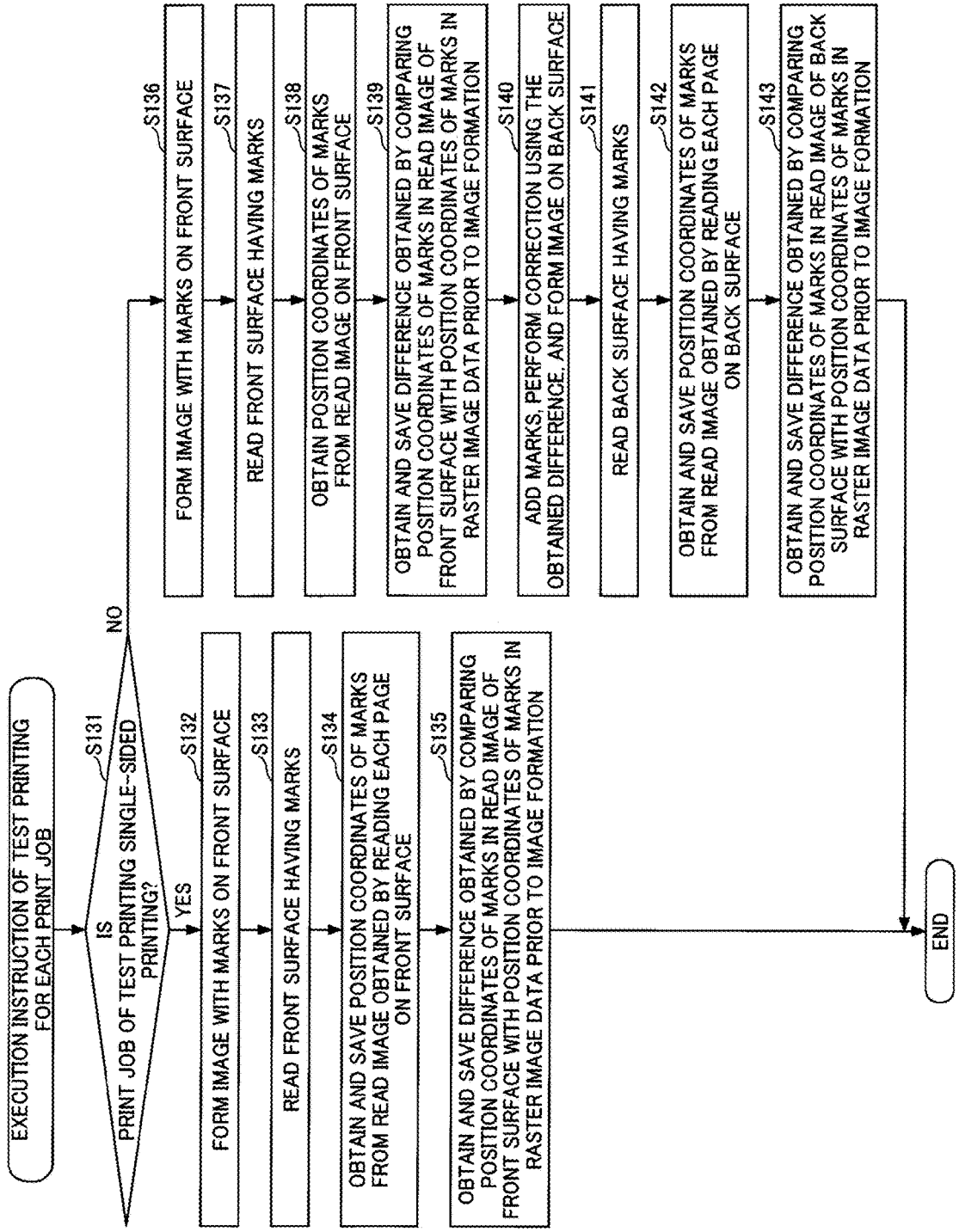

[Fig. 14]

| COMBINATION LIST IN CORRECTED IMAGE FORMATION MODE | | | |
|---|---|---|---|
| FRONT SURFACE (FIRST SURFACE) | BACK SURFACE (SECOND SURFACE) | | OPERATION |
| DO NOT PERFORM CORRECTION | DO NOT PERFORM CORRECTION | | NEITHER FRONT SURFACE NOR BACK SURFACE IS CORRECTED. |
| IMAGE POSITION CORRECTION PRINTING FOR EACH OF RECORDING MEDIA TO BE CORRECTED | (a) MEDIA-BASED IMAGE POSITION CORRECTION | | BOTH FRONT SURFACE AND BACK SURFACE ARE CORRECTED BY THE AMOUNT OF CORRECTION REGISTERED FOR EACH SHEET. |
| | (c-1) POSITIONING OF FRONT AND BACK. BACK SURFACE IS CORRECTED SO THAT BACK SURFACE MATCHES WITH FRONT SURFACE. MARKS ARE USED. | | CORRECT FRONT SURFACE BY THE AMOUNT OF CORRECTION REGISTERED FOR EACH SHEET, AND MAKE BACK SURFACE MATCH WITH THE FRONT SURFACE. |
| | (c-2) POSITIONING OF FRONT AND BACK. BACK SURFACE IS CORRECTED SO THAT BACK SURFACE MATCHES WITH FRONT SURFACE. EDGES OF RECORDING MEDIUM ARE USED. | | CORRECT FRONT SURFACE BY THE AMOUNT OF CORRECTION REGISTERED FOR EACH SHEET, AND MAKE BACK SURFACE MATCH WITH THE FRONT SURFACE. MARKS ARE NOT ADDED BECAUSE CORRECTION IS PERFORMED WITH EDGES OF RECORDING MEDIUM, AND POSITIONING OF BACK SURFACE CANNOT BE CORRECTED. |
| IMAGE POSITION CORRECTION PRINTING FOR EACH PAGE OF PRINT JOB TO BE CORRECTED | (b) IMAGE POSITION CORRECTION FOR EACH PAGE. | | BOTH OF FRONT AND BACK SURFACES ARE CORRECTED BY THE AMOUNT OF CORRECTION FOR EACH PAGE ASSOCIATED WITH PRINT JOB. CORRECTION VALUES OBTAINED FROM TEST PRINTING ARE USED. CORRECTION VALUES OBTAINED FROM TEST PRINTING ARE USED FOR BOTH OF THE FRONT AND BACK SURFACES. |
| | (c-1) POSITIONING OF FRONT AND BACK. BACK SURFACE IS CORRECTED SO THAT BACK SURFACE MATCHES WITH FRONT SURFACE. MARKS ARE USED. | | FRONT SURFACE IS CORRECTED BY THE AMOUNT OF CORRECTION THAT IS SET FOR EACH PAGE, AND BACK SURFACE IS CORRECTED TO MATCH WITH THE FRONT SURFACE. FOR FRONT SURFACE, CORRECTION VALUES OBTAINED FROM TEST PRINTING ARE USED. FOR POSITIONING OF FRONT AND BACK, CORRECTION VALUES IN REAL TIME ARE USED. MARKS ARE ADDED TO FRONT SURFACE, AND CORRECTION IS PERFORMED TO MAKE BACK SURFACE MATCH WITH THE POSITION ON FRONT SURFACE. ON BACK SURFACE, CORRECTION VALUES OBTAINED FROM TEST PRINTING ARE NOT USED. THIS IS BECAUSE POSITIONING OF FRONT AND BACK IS NOT AVAILABLE FOR SINGLE-SIDED PRINTING. |
| | (c-2) POSITIONING OF FRONT AND BACK. BACK SURFACE IS CORRECTED SO THAT BACK SURFACE MATCHES WITH FRONT SURFACE. EDGES OF RECORDING MEDIUM ARE USED. | | FRONT SURFACE IS CORRECTED BY THE AMOUNT OF CORRECTION THAT IS SET FOR EACH PAGE, AND BACK SURFACE IS CORRECTED TO MATCH WITH THE FRONT SURFACE. MARKS ARE NOT ADDED BECAUSE CORRECTION IS PERFORMED WITH EDGES OF RECORDING MEDIUM, AND POSITIONING OF BACK SURFACE CANNOT BE CORRECTED. FOR FRONT SURFACE, CORRECTION VALUES OBTAINED FROM TEST PRINTING ARE USED. FOR POSITIONING OF FRONT AND BACK, CORRECTION VALUES IN REAL TIME ARE USED. MARKS ARE ADDED TO FRONT SURFACE, AND CORRECTION IS PERFORMED TO MAKE BACK SURFACE MATCH WITH THE POSITION ON FRONT SURFACE. ON BACK SURFACE, CORRECTION VALUES OBTAINED FROM TEST PRINTING ARE NOT USED. THIS IS BECAUSE POSITIONING OF FRONT AND BACK IS NOT AVAILABLE FOR SINGLE-SIDED PRINTING. |

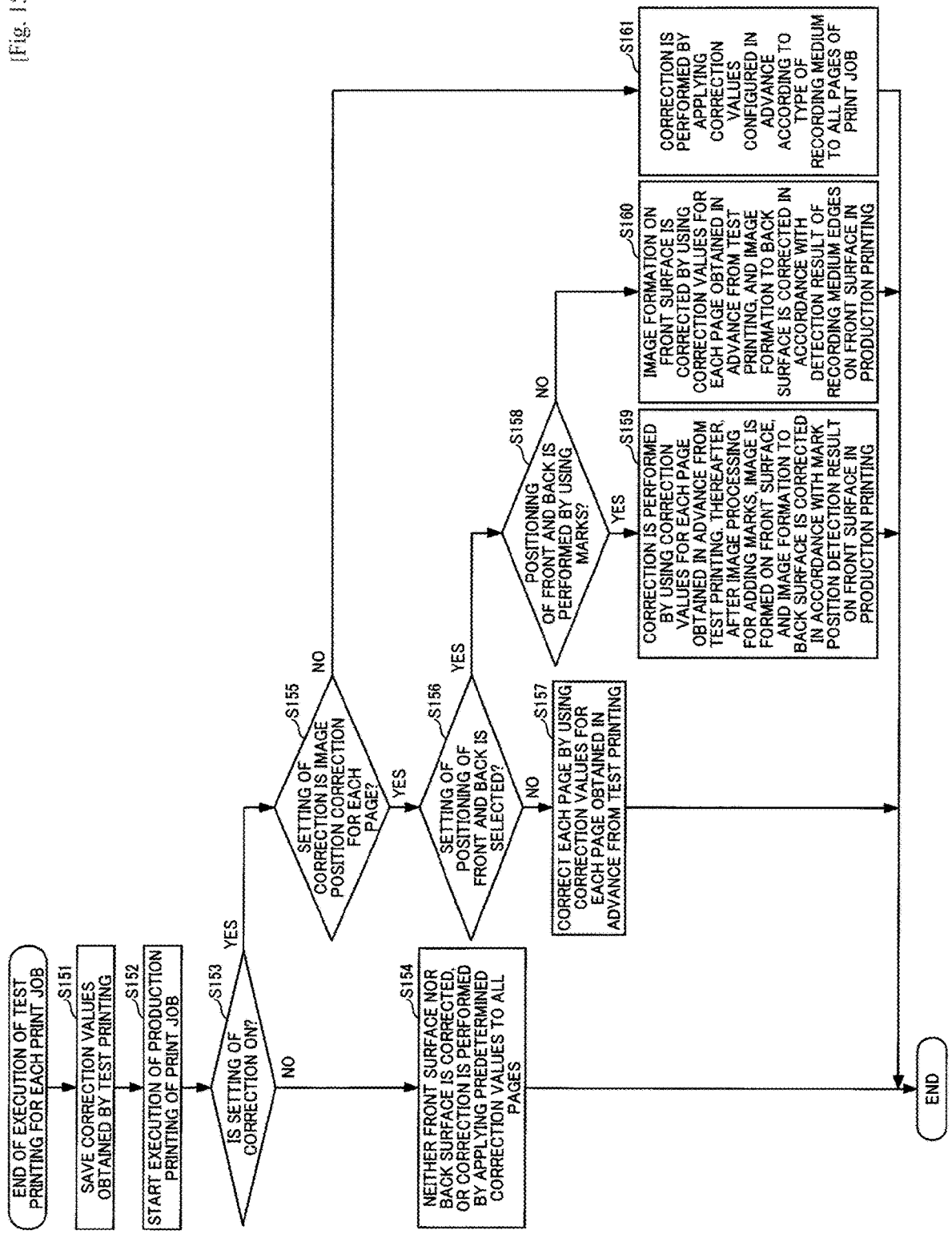

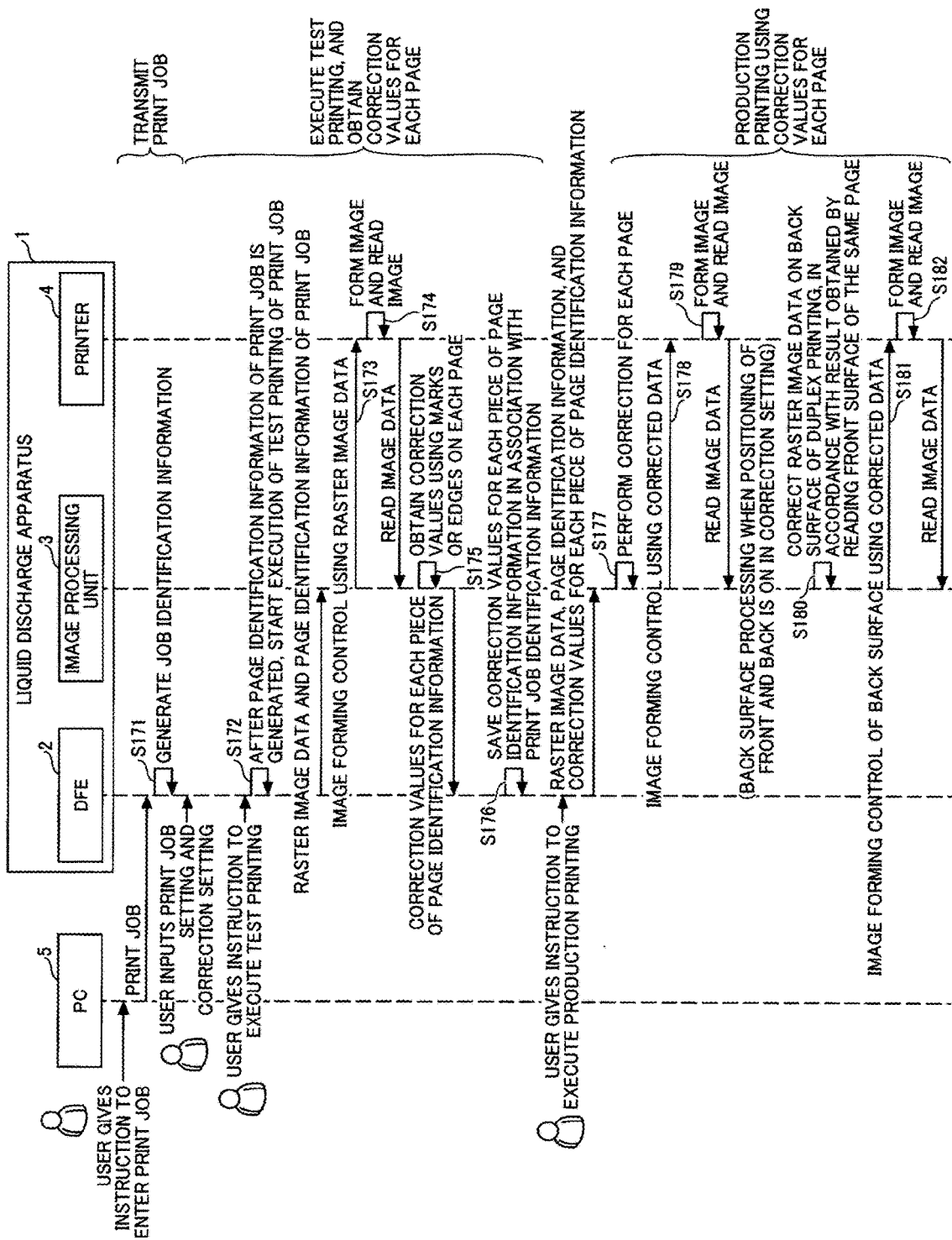
[Fig. 16]

[Fig. 17]
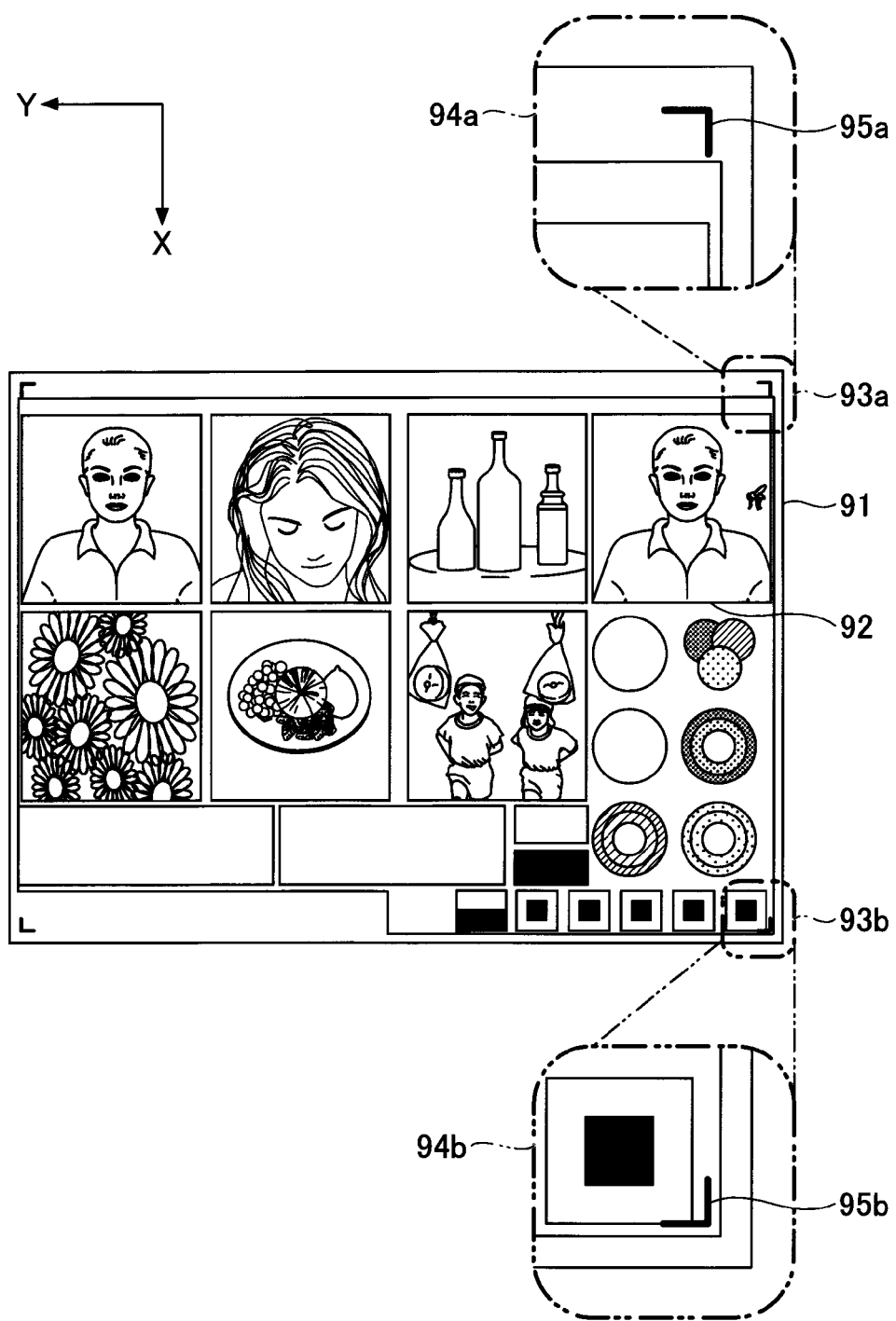

[Fig. 18A]
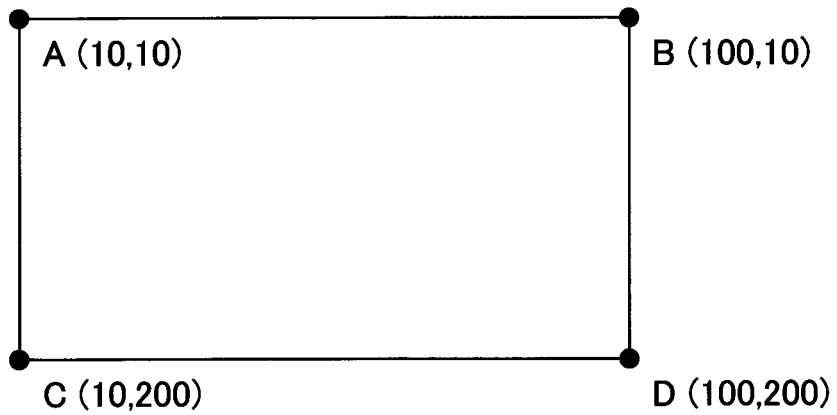
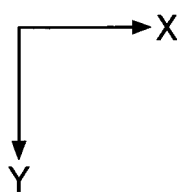
[Fig. 18B]
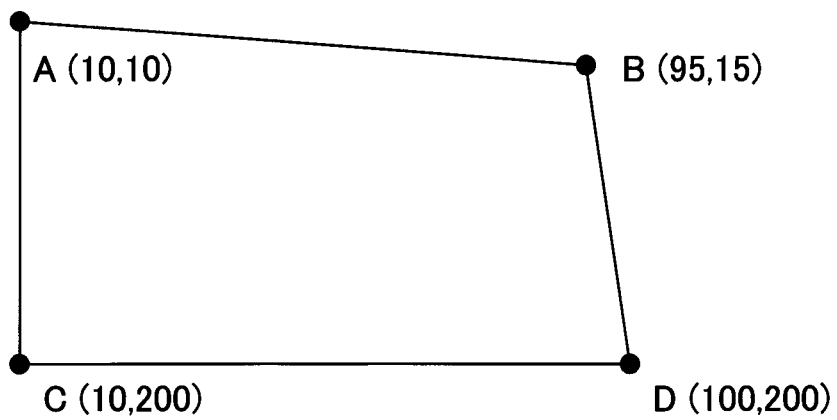
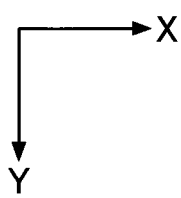

[Fig. 19]
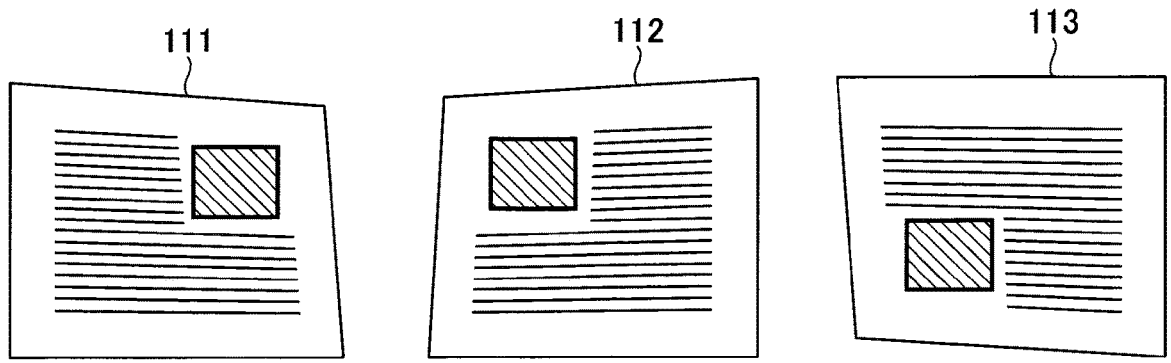
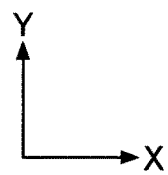
[Fig. 20]
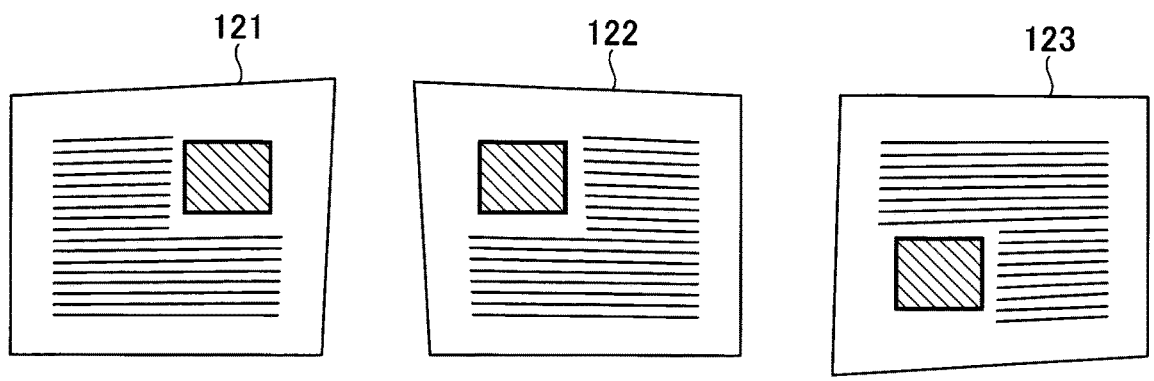
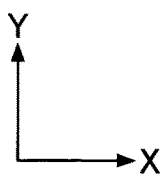

[Fig. 21]
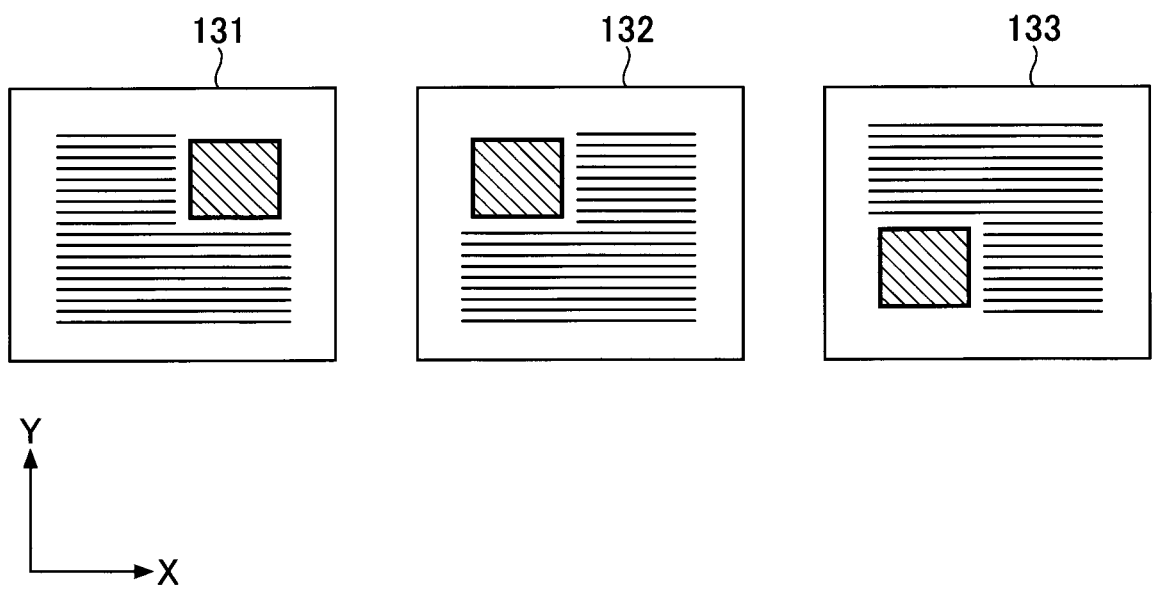

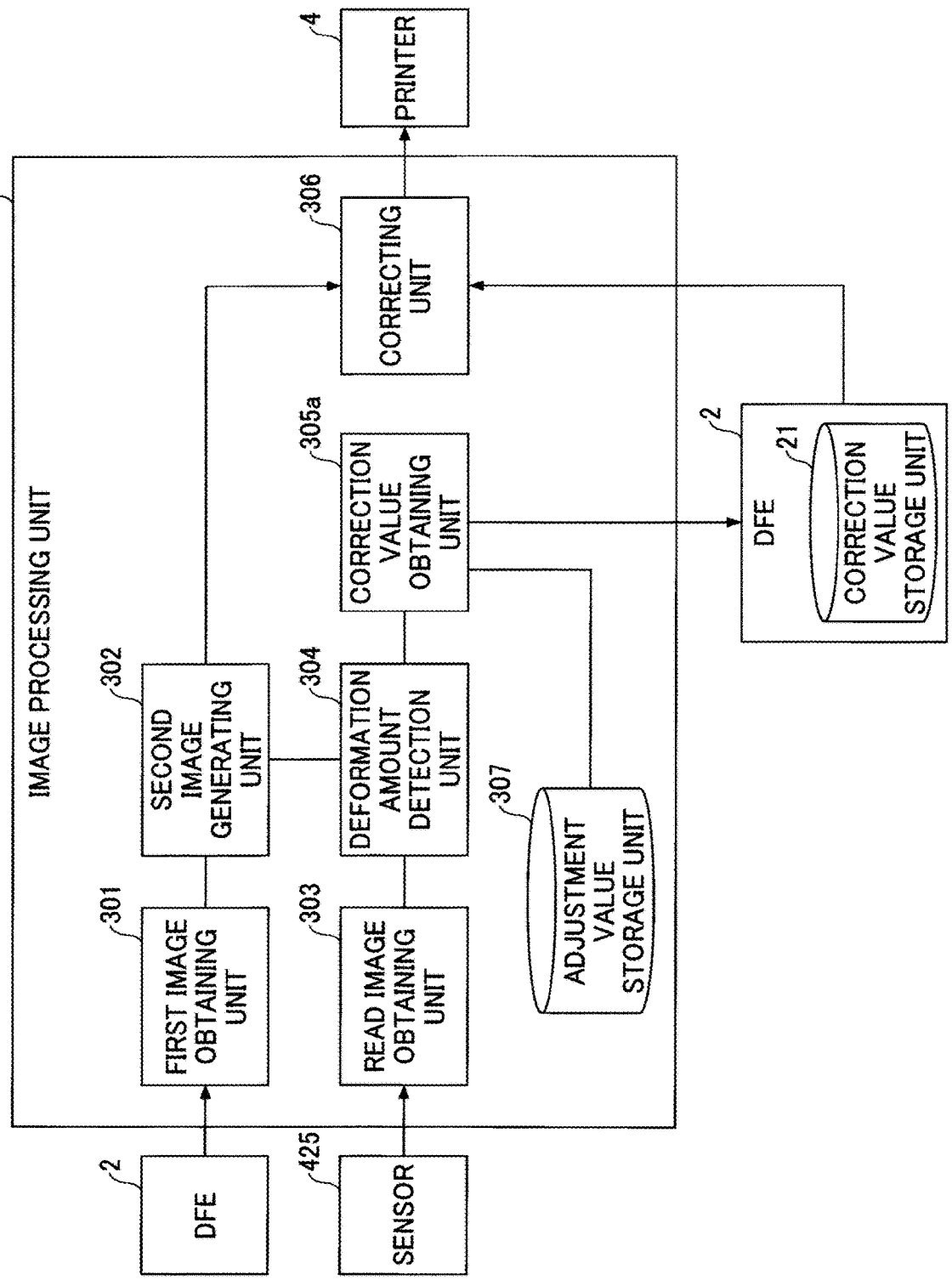

[Fig. 23]
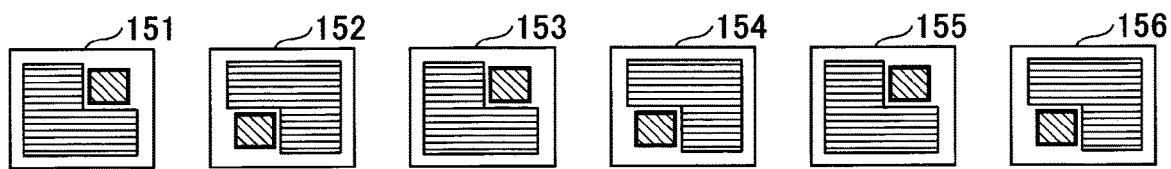
[Fig. 24]
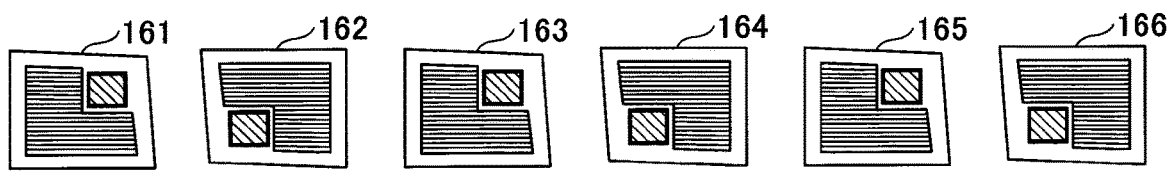
[Fig. 25]
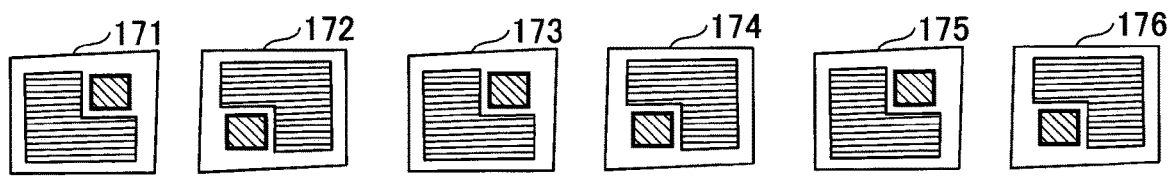

[Fig. 26]
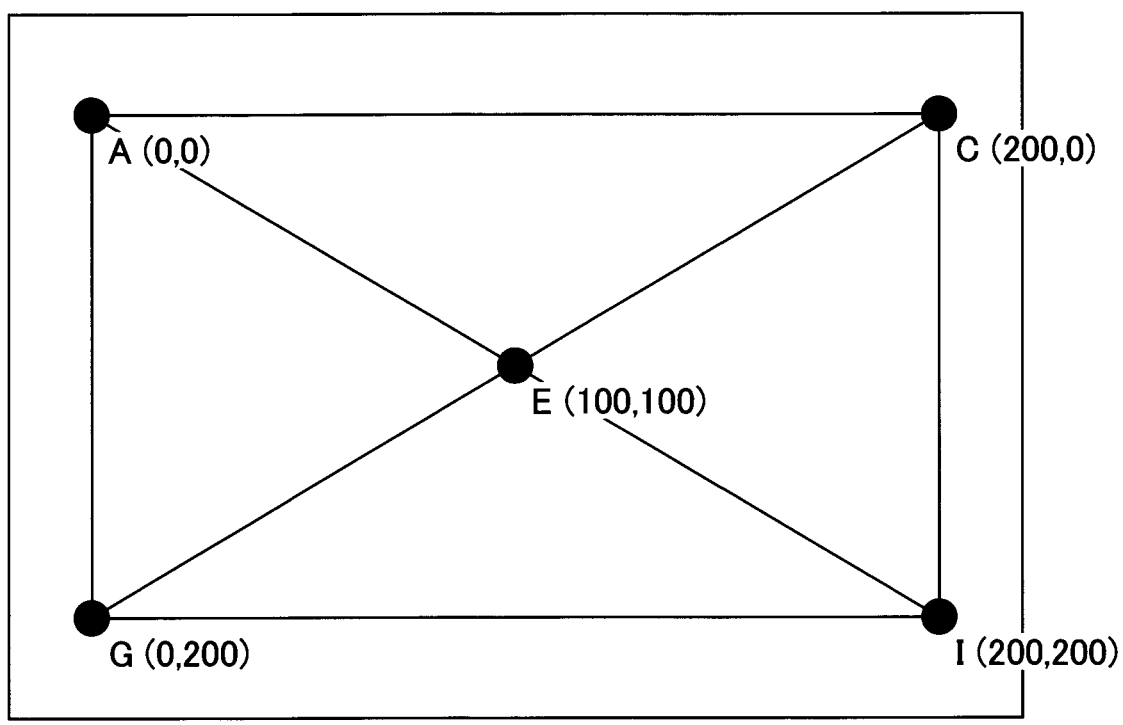
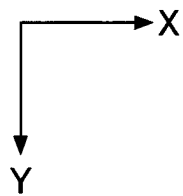

[Fig. 27]
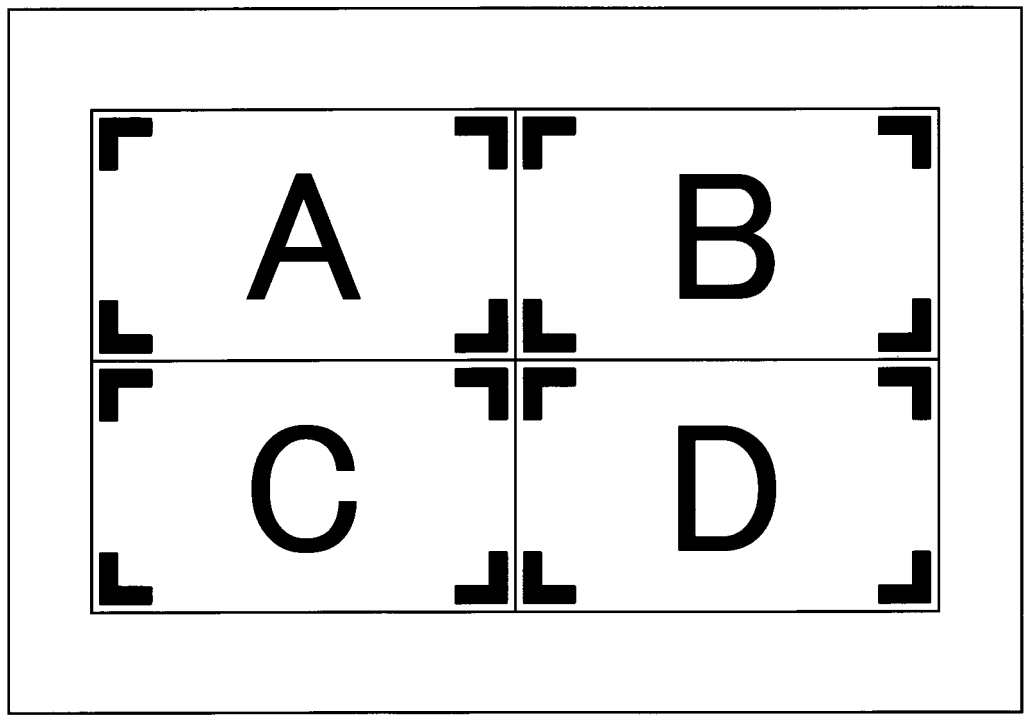
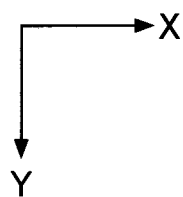

[Fig. 28]
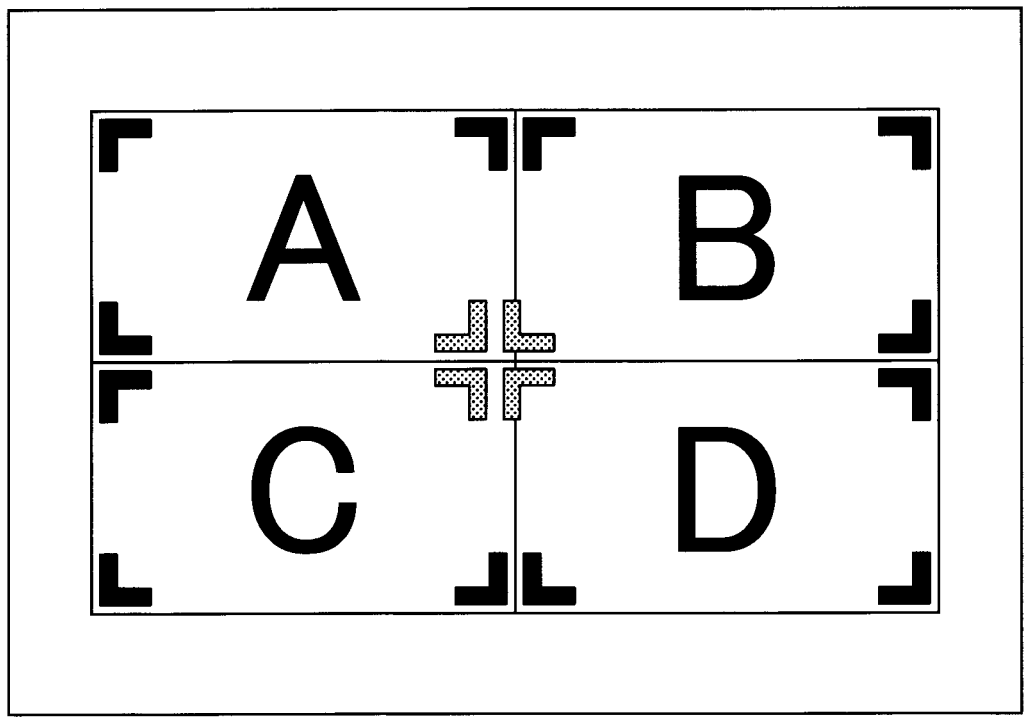
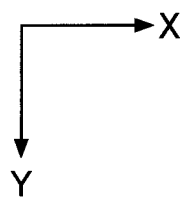

[Fig. 29]
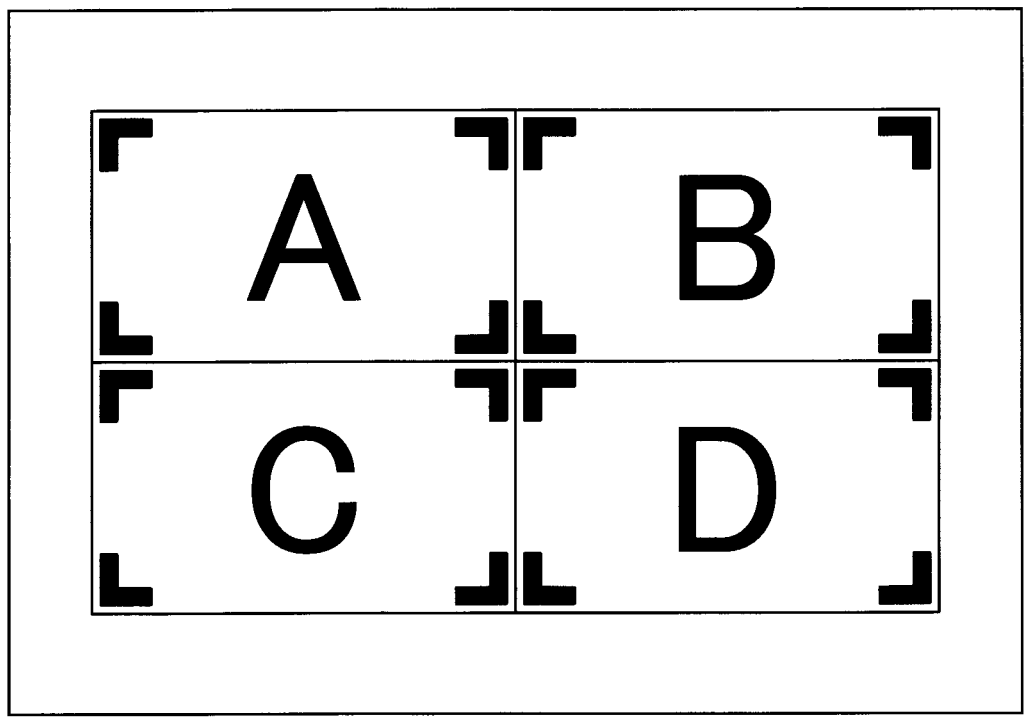
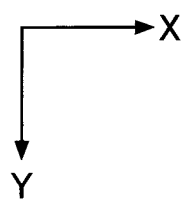

[Fig. 30]
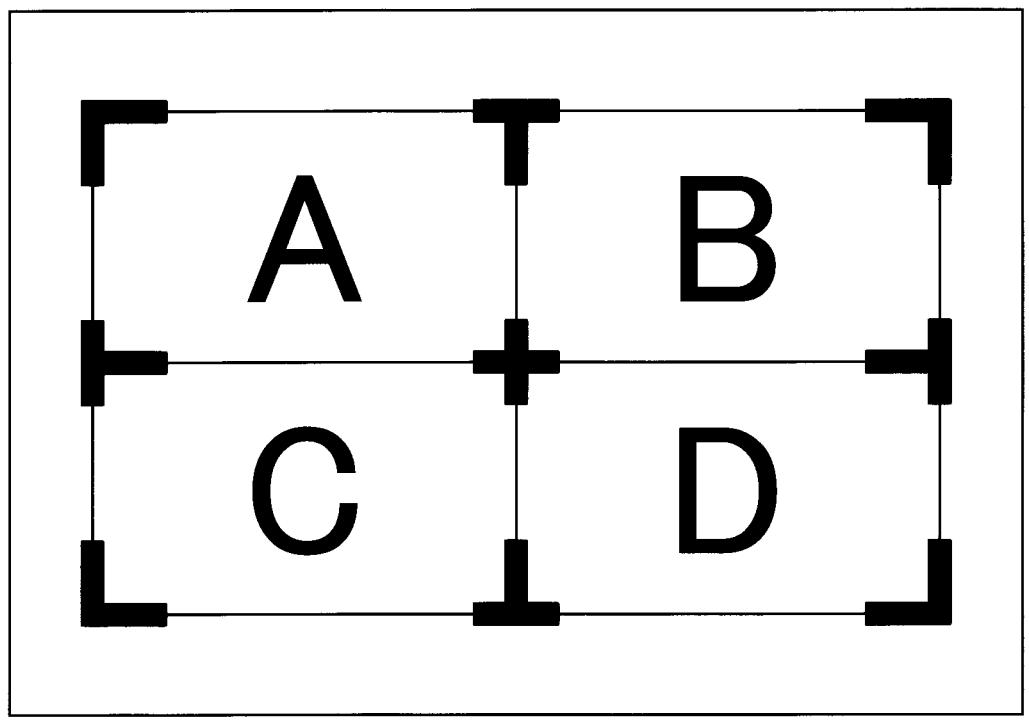
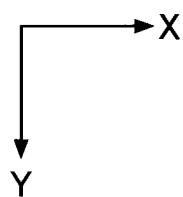

[Fig. 31]
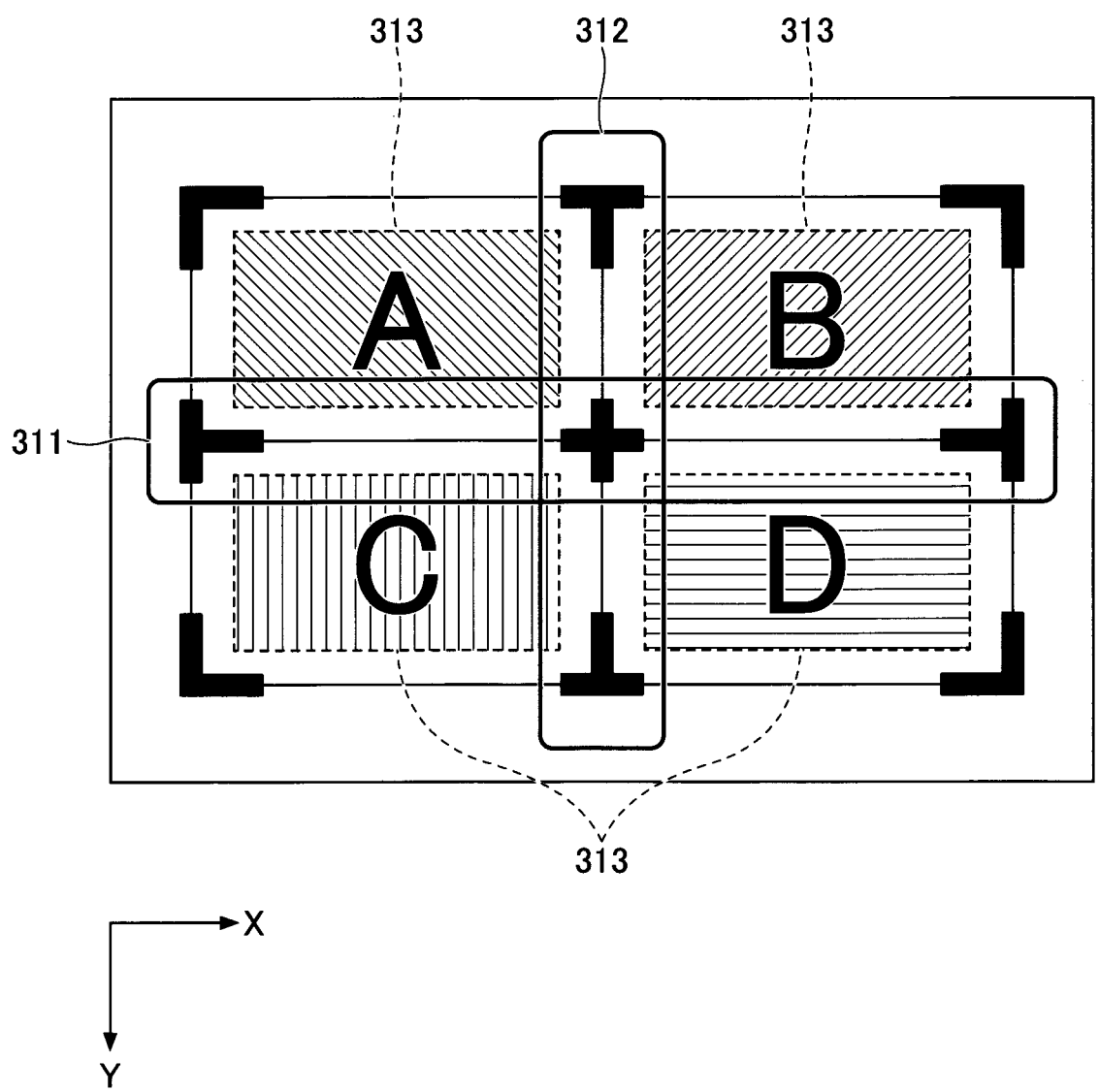

[Fig. 32]
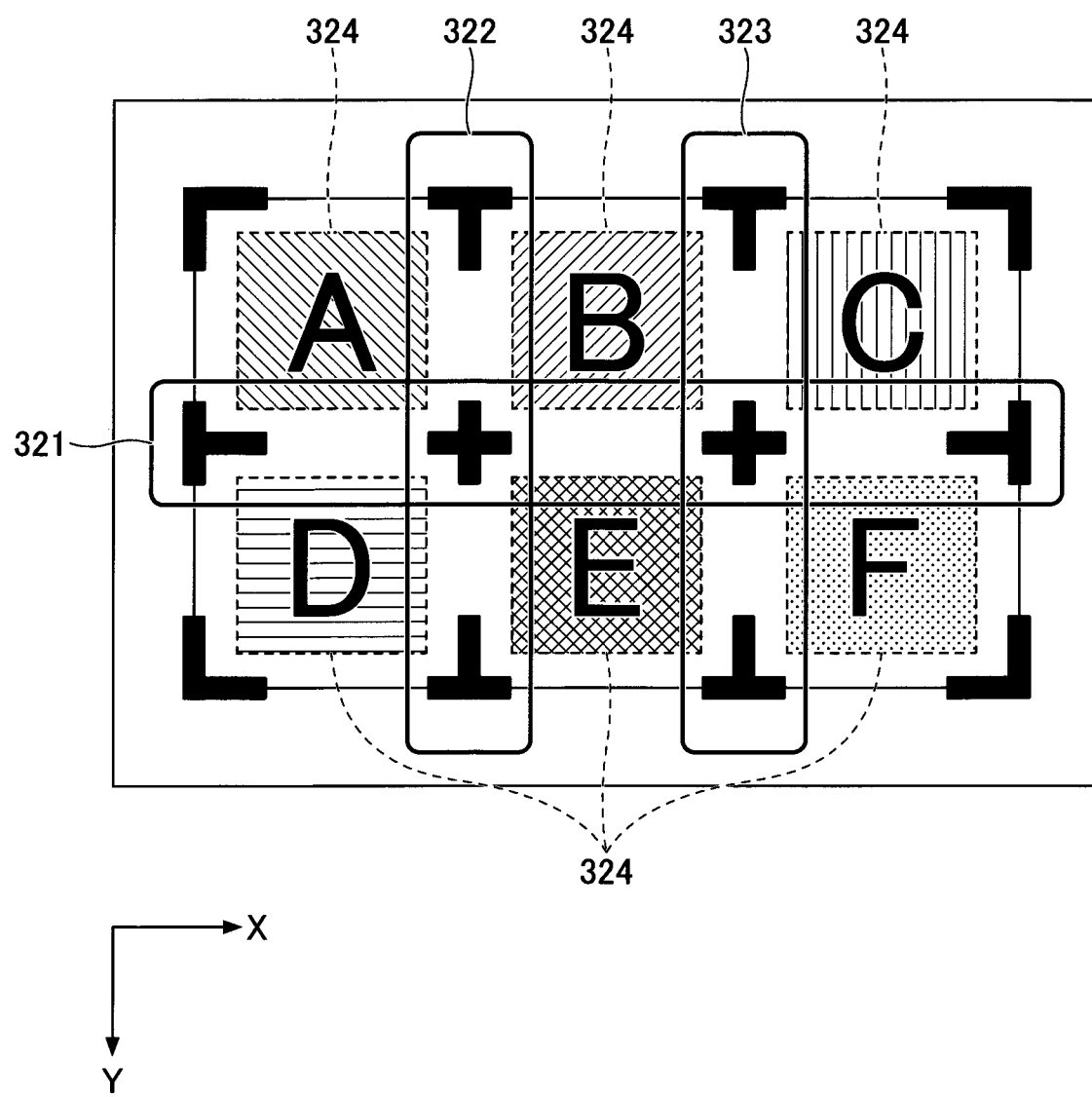

[Fig. 33]
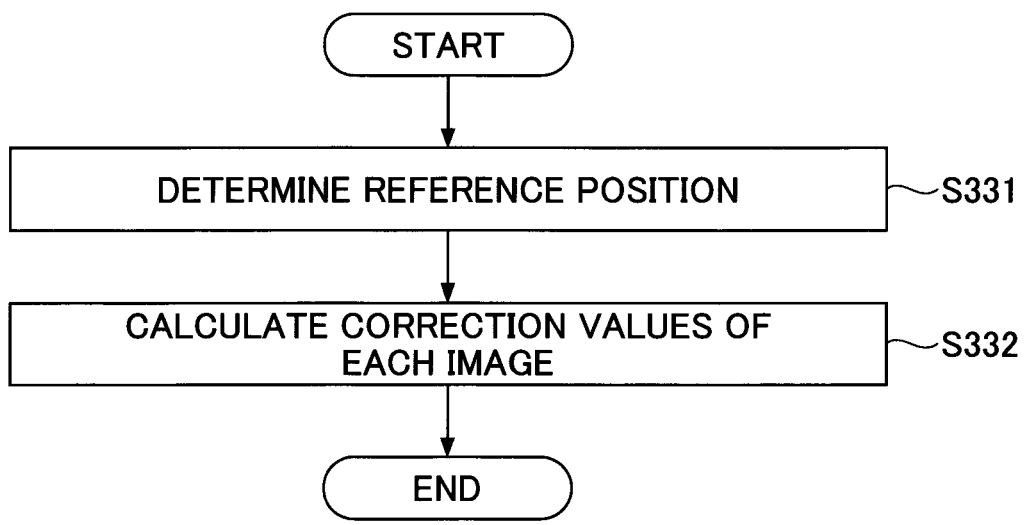

[Fig. 34]
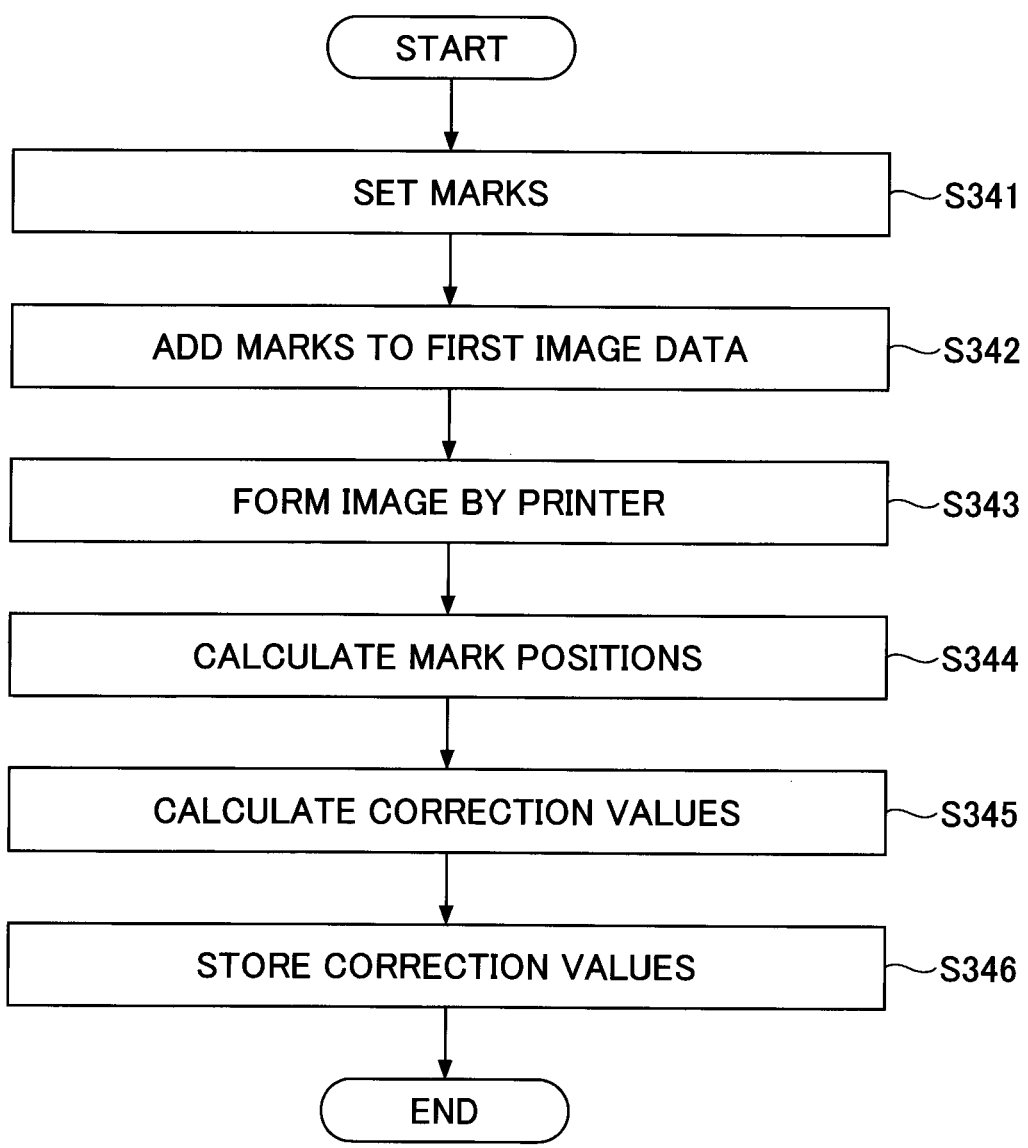

LIQUID DISCHARGE APPARATUS, CONTROL METHOD FOR CORRECTING LIQUID DISCHARGE APPARATUS, AND RECORDING MEDIUM

CROSS-REFERENCE TO RELATED APPLICATIONS

This application is based on PCT filing PCT/JP2021/033700, filed on Sep. 14, 2021, which claims the benefit of priorities of Japanese Priority Application No. 2020-154275, filed on Sep. 15, 2020, and Japanese Priority Application No. 2021-123609, filed on Jul. 28, 2021, the contents of each are incorporated herein by reference.

TECHNICAL FIELD

The present disclosure relates to a liquid discharge apparatus, a control method for correcting the liquid discharge apparatus, and a recording medium.

BACKGROUND ART

Conventionally, for an image forming apparatus that forms images onto recording media, there is known a technique for correcting an image formed on a recording medium when the formation position of the image on the recording medium shifts in position or the image is deformed.

Also, there is disclosed a technique for correcting an image on the basis of a detection result of a figure formed on an image carrier (for example, see PTL 1).

CITATION LIST

Patent Literature

[PTL 1] Japanese Unexamined Patent Application Publication No. 2010-210651

SUMMARY OF INVENTION

Technical Problem

However, in a liquid discharge apparatus that forms images onto recording media, the expansion-and-contraction rates of recording media vary from page to page depending on an image forming condition such as an image forming speed or the amount of liquid to be discharged, and therefore, with the technique of PTL 1, it may be impossible to correct images with a high degree of accuracy.

It is an object of the present disclosure to ensure a correction accuracy for correcting an image in a liquid discharge apparatus.

Solution to Problem

A liquid discharge apparatus according to an aspect of the present disclosure is a liquid discharge apparatus for forming an image on a recording medium, comprising:
  a first image obtaining unit configured to obtain first image data;
  a second image generating unit configured to generate second data by adding a predetermined figure to the first image data;
  a correcting unit configured to generate third image data obtained by correcting, for each of pages, the first image data, based on both the second image data and read image data obtained by reading an image formed on the recording medium based on the second image data; and
  a liquid discharging unit configured to discharge liquid onto the recording medium, based on the third image data.

Advantageous Effects of Invention

According to the present disclosure, a correction accuracy for correcting an image in a liquid discharge apparatus can be ensured.

BRIEF DESCRIPTION OF DRAWINGS

FIG. 1 is a block diagram illustrating an example of overall configuration of a liquid discharge apparatus according to an embodiment.

FIG. 2 is a drawing illustrating an example of configuration of a printer according to an embodiment.

FIG. 3 is a block diagram illustrating an example of hardware configuration of a DFE according to an embodiment.

FIG. 4 is a block diagram illustrating an example of hardware configuration of an image processing unit according to an embodiment.

FIG. 5 is a block diagram illustrating an example of a functional configuration of an image processing unit according to a first embodiment.

FIG. 6 is a flow drawing illustrating an example of overall configuration of a liquid discharge apparatus according to an embodiment.

FIG. 7 is a flow drawing illustrating an example of correction values obtaining operation of a liquid discharge apparatus according to an embodiment.

FIG. 8 is a flow drawing illustrating an example of a corrected image formation operation of a liquid discharge apparatus according to an embodiment.

FIG. 9 is a drawing illustrating an example of a list screen of print jobs.

FIG. 10 is a drawing illustrating a first example of an image position correction setting screen.

FIG. 11 is a drawing illustrating a second example of an image position correction setting screen.

FIG. 12 is a drawing illustrating a third example of an image position correction setting screen.

FIG. 13 is a flow diagram illustrating an example of correction values obtaining operation using a test printing by the liquid discharge apparatus according to the embodiment.

FIG. 14 is a drawing illustrating an example of a combination list of a corrected image formation mode.

FIG. 15 is a flow diagram illustrating an example of a correction operation using correction values by the liquid discharge apparatus according to the embodiment.

FIG. 16 is a sequence diagram illustrating an example of a correction operation using correction values by the liquid discharge apparatus according to the embodiment.

FIG. 17 is a drawing illustrating an example of marks added to drawing data.

FIG. 18A is a drawing illustrating coordinate points of mark-attached raster image data for explaining an example of a correction method of deformation of an image.

FIG. 18B is a drawing illustrating coordinate points of read image data for explaining an example of a correction method of deformation of an image.

FIG. 19 is a drawing illustrating an image forming result example in which the correction according to the embodiment is not performed.

FIG. 20 is a drawing illustrating an example of raster image data in which the correction according to the embodiment is performed.

FIG. 21 is a drawing illustrating an example of raster image data in which the correction according to the embodiment is performed.

FIG. 22 is a block diagram illustrating an example of a functional configuration of an image processing unit according to a second embodiment.

FIG. 23 is a drawing illustrating an example of an ideal variable print result.

FIG. 24 is a drawing illustrating an example of variable print result in which the correction according to the embodiment is not performed.

FIG. 25 is a drawing illustrating an example of variable print result in which the correction according to the third embodiment is performed.

FIG. 26 is a drawing illustrating an example of marks according to a fourth embodiment.

FIG. 27 is a drawing illustrating a first example of a correction according to the fourth embodiment.

FIG. 28 is a drawing illustrating a second example of a correction according to the fourth embodiment.

FIG. 29 is a drawing illustrating a third example of a correction according to the fourth embodiment.

FIG. 30 is a drawing illustrating a fourth example of a correction according to the fourth embodiment.

FIG. 31 is a drawing illustrating a fifth example of a correction according to the fourth embodiment.

FIG. 32 is a drawing illustrating a sixth example of a correction according to the fourth embodiment.

FIG. 33 is a flow diagram illustrating an example of correction value calculation operation of a liquid discharge apparatus according to the fourth embodiment.

FIG. 34 is a flow diagram illustrating an example of detailed operation of correction value calculation by the liquid discharge apparatus according to the fourth embodiment.

DESCRIPTION OF EMBODIMENTS

Hereinafter, modes for carrying out the invention will be described with reference to drawings. In the drawings, the same constituent elements are denoted with the same reference numerals, and duplicate explanations thereabout are omitted as appropriate.

Further, the embodiments described below are examples of a liquid discharge apparatus for embodying the technical concept of the present invention, and the present invention is not limited to the embodiments described below. Unless otherwise specified, the dimensions, materials, shapes, relative arrangements thereof, parameter values, and the like of the constituent elements described below are not intended to limit the subject matter of the present invention to only those described below, and are intended to show an example. Also, the sizes, the arrangements of the members illustrated in the drawings may be exaggerated to clarify the explanation. It should be noted that terms "print" and "image forming" used in the embodiments are assumed to be synonymous.

In the embodiment, first image data is obtained, and second image data obtained by adding predetermined figures to the first image data is generated. Then, third image data is generated by correcting, for each of the pages, the first image data, on the basis of both the second image data and the read image data of the image formed on the recording medium based on the second image data, and a liquid is discharged onto a recording medium on the basis of the third image data. The liquid is discharged onto the recording medium on the basis of the third image data that has been corrected according to the amount of deformation of the recording medium for each image, so that even when images formed on recording media are different in the amount of deformation of the recording medium, the correction accuracies of the images are ensured.

Hereinafter, embodiments are described while ink is assumed to be an example of liquid and paper is assumed to be an example of recording medium. In the embodiments, a "figure" is referred to as a "mark".

First Embodiment

<Example of Overall Configuration of Liquid Discharge Apparatus 1>

First, an overall configuration of a liquid discharge apparatus 1 is explained with reference to FIG. 1. FIG. 1 is a block diagram illustrating an example of overall configuration of a liquid discharge apparatus 1. As illustrated in FIG. 1, the liquid discharge apparatus 1 includes a digital front end (DFE) 2, an image processing unit 3, and a printer 4, which are configured to be able to transmit and receive data or signals to and from one another.

The liquid discharge apparatus 1 receives a print job from a personal computer (PC) 5, i.e., an external apparatus, forms an image on a sheet on the basis of the print job, and outputs a printed matter 6 constituted by the sheet having the image formed thereon. A sheet is a sheet member such as plain paper or coated paper. However, the recording medium is not limited to the sheet, and may be a sheet member such as an OHP (overhead projector) sheet or a film. The sheet member is preferably a cut sheet that is cut to a predetermined size, but may be continuous form paper that is not cut.

The DFE 2 generates raster image data, i.e., an example of first image data, with a raster image processor (RIP) engine, on the basis of a print job received the PC 5, and outputs the raster image data to the image processing unit 3.

Also, the DFE 2 receives, from the image processing unit 3, correction values for correcting the image to be formed on the sheet, and stores the correction values. The DFE 2 can output the correction values, together with the raster image data, to the image processing unit 3.

The image processing unit 3 is an example of an image processing apparatus for executing processing for correcting the image to be formed on the sheet. The image processing unit 3 generates mark-attached raster image data (an example of second image data) obtained by adding predetermined marks to the raster image data received from the DFE 2. In addition, the image processing unit 3 obtains the read image data that is read by a sensor provided in the printer 4 from the printer 4.

The image processing unit 3 obtains, through calculation, correction values on the basis of the amount of deformation of the sheet obtained from the mark-attached raster image data and the read image data. Then, the image processing unit 3 corrects either the raster image data or the mark-attached raster image data on the basis of the correction value, and generates either the raster image data or the mark-attached raster image data that has been corrected (an example of third image data). In the following explanation, for the sake of simplifying the explanation, any one of the raster image data or the mark-attached raster image data that has been corrected is simply referred to as the corrected data.

Any one of the mark-attached raster image data or the corrected data is output to the printer 4.

The printer 4 discharges ink to form an image on a sheet, on the basis of any one of the mark-attached raster image data or the corrected data received from the image processing unit 3.

In the above explanation, an example in which the image processing unit 3 corrects the raster image data generated by the DFE 2 has been explained, but the image processing unit 3 may be configured to correct image data included in the print job prior to generation of raster image data by the DFE 2. Specifically, the image processing unit 3 may correct RGB image data constituted by R (red), G (green), and B (blue) that is included in the print job prior to conversion into CMYK image data constituted by C (cyan), M (magenta), Y (yellow), and K (black). In this case, the RGB image data included in the print job corresponds to an example of first image data.

<Example of Configuration of Printer 4>

Next, a configuration of the printer 4 included in the liquid discharge apparatus 1 is explained with reference to FIG. 2. FIG. 2 is a drawing for explaining an example of configuration of the printer 4.

As illustrated in FIG. 2, the printer 4 includes a feeding unit 41, a print unit 42, a drying unit 43, a cooling unit 44, and a conveying unit 45. Arrows extending across these units, i.e., arrows starting from the feeding unit 41, passing through the print unit 42, the drying unit 43, and the cooling unit 44, curving back in the conveying unit 45, passing through to the print unit 42 again, and returning back to the feeding unit 41, indicate a conveying path P along which sheets are conveyed in the printer 4.

In the printer 4, the print unit 42 forms, with ink for forming image, an image on a front surface (i.e., a first surface) of a sheet fed from the feeding unit 41. Then, the drying unit 43 dries the ink that has adhered to the sheet, and thereafter, a sheet-discharge tray 451 of the conveying unit 45 is used to discharge the sheet. In a case of duplex printing for forming images on both of the front and back surfaces of a sheet, a duplex unit 452 switches back the sheet, and the print unit 42 forms an image on a back surface (i.e., a second surface) on the opposite side from the front surface of the sheet, again. Thereafter, the sheet passes through the drying unit 43, the cooling unit 44, and the conveying unit 45, and then, the sheet-discharge tray 451 or the sheet-discharge tray 412 is used to discharge the sheet.

(Feeding Unit 41)

The feeding unit 41 includes: a sheet-feeding tray 411 on which multiple sheets are stacked; and a sheet-discharge tray 412 on which sheets having images formed on the back surfaces thereof are stacked and stored in order. Sheets are separated one by one and fed from the sheet-feeding tray 411 by a feeding apparatus (not illustrated), and fed to the print unit 42. The feeding unit 41 is not particularly limited in its configuration, so long as the feeding unit 41 feeds sheets to the print unit 42.

(Print Unit 42)

The print unit 42 includes: a receiving body 421 for receiving a fed sheet; a conveying drum 422 for carrying and conveying a sheet on the outer peripheral surface thereof; and an ink discharging unit 423 for discharging ink from nozzles toward the sheet carried on the conveying drum 422. In addition, the print unit 42 includes: a feeding body 424 for feeding the sheet conveyed by the conveying drum 422 to the drying unit 43; and a sensor 425 for reading the image formed on the sheet.

The sheet conveyed from the feeding unit 41 to the print unit 42 is conveyed according to the movement of the surface of the receiving body 421 with the end of the sheet being gripped by a sheet gripper provided on the surface of the receiving body 421. The sheet conveyed by the receiving body 421 is delivered to the conveying drum 422 at the position facing the conveying drum 422.

A sheet gripper is also provided on the surface of the conveying drum 422, and the end of the sheet is gripped by the sheet gripper. The surface of the conveying drum 422 is formed with multiple suction holes in a dispersed manner, and suction air flow to the inner side of the conveying drum 422 is generated in each of the suction holes by a suction apparatus. The sheet fed from the receiving body 421 to the conveying drum 422 has its end gripped by the sheet gripper, and attracted to the surface of the conveying drum 422 by the suction air flow, so that the sheet is conveyed according to the movement of the surface of the conveying drum 422.

The ink discharging unit 423 is an example of a liquid discharging unit that discharges inks in four colors, i.e., K, C, M, Y, from the nozzles onto the sheet on the basis of any one of the mark-attached raster image data or the corrected data. An image is formed on the sheet with the inks discharged by the ink discharging unit 423. The ink discharging unit 423 includes respective ink dischargers for respective colors of inks. The respective ink dischargers for respective colors are not particularly limited in their configurations, and may be in any configurations, so long as respective ink dischargers for respective colors discharge inks.

The colors of the inks are four colors, i.e., K, C, M, Y, in the present embodiment, but are not limited thereto. As necessary, ink dischargers discharging inks of special colors such as white, gold, silver, and the like may be provided, and ink dischargers for discharging inks that do not constitute images, such as a surface-coating liquid, may be provided.

The discharge operations of the respective ink dischargers of the ink discharging unit 423 are controlled by driving signals according to any one of the mark-attached raster image data or the corrected data. When the sheet carried on the conveying drum 422 passes an area facing the ink discharging unit 423, the inks of the respective colors are discharged from the nozzles included in the ink dischargers of the respective colors, thereby adhering to the sheet, so that an image according to the any one of the mark-attached raster image data or the corrected data is formed. The print unit 42 is not particularly limited in its configuration, so long as the print unit 42 forms an image by causing inks to adhere to the sheet.

The sensor 425 is an example of a reading unit that is provided in the print unit 42 to read an image formed on a sheet. The image that is read by the sensor 425 is an image formed on the sheet on the basis of mark-attached raster image data having predetermined marks added thereto. The sensor 425 outputs read image data, i.e., a result obtained by reading an image, to the image processing unit 3 (see FIG. 1).

The sensor 425 is a charge coupled device (CCD) line sensor in which pixels that output electric signals according to the received light intensity are arranged in a one-dimensional array. The arrangement direction of pixels is the direction that intersects the direction in which sheets are conveyed (i.e., a lengthwise direction of a paper surface). Also, the sensor 425 includes a pixel array that receives red light (R), a pixel array that receives green light (G), and a pixel array that receives blue light (B).

With the pixel arrays in respective colors, the sensor 425 outputs an electric signal according to the light intensity of the reflected light that is reflected by the image formed on the sheet. Using the output of the sensor 425, the image formed on the sheet is read.

The sensor 425 may be provided with a light source that irradiates the sheet with light. By irradiating the sheet with light from the light source, the brightness for reading with the sensor 425 can be secured. Also, the sensor 425 may be constituted by a complementary metal-oxide-semiconductor (CMOS), a photo diode (PD) array, or the like instead of the charged coupled device (CCD). The sensor 425 is not particularly limited in its configuration, so long as the sensor 425 reads images formed on sheets.

(Drying Unit 43)

The drying unit 43 dries the ink that has adhered to the sheet by the print unit 42. The sheet conveyed from the print unit 42 is dried with heat by the drying unit 43 and then delivered to the cooling unit 44. Dry processing is applied to the ink on the sheet, which evaporates liquid such as water in the ink, and the ink is fixed on the sheet and curl of the sheet is alleviated. The drying unit 43 is not particularly limited in its configuration, so long as the drying unit 43 dries ink on sheets.

(Cooling Unit 44)

The cooling unit 44 cools the sheet heated by the drying unit 43. The cooling unit 44 cools the sheet by blowing air to the sheet with a fan or by bringing the sheet into contact with the surface of a cooling-conveying drum. The cooling unit 44 is not particularly limited in its configuration, so long as the cooling unit 44 cools the sheet.

(Conveying Unit 45)

The conveying unit 45 includes: a sheet-discharge tray 451 on which sheets conveyed from the cooling unit 44 are stacked and stored in order; and a duplex unit 452 that performs duplex conveying processing of a sheet to perform duplex printing on the sheet by reversing the sheet having the image formed thereon by the print unit 42 and feeding the sheet back to the image forming unit 200.

(Other Functional Units)

As explained above, the printer 4 includes the feeding unit 41, the print unit 42, the drying unit 43, the cooling unit 44, and the conveying unit 45, but may also include other functional units as necessary. For example, a pre-treatment unit that performs pre-treatment of image formation may be added between the feeding unit 41 and the print unit 42, and a post-processing unit that performs post-processing of image formation may be added between the cooling unit 44 and the conveying unit 45.

An example of the pre-treatment unit includes a unit that performs treatment liquid application processing for applying treatment liquid to sheets to alleviate bleeding of ink that is caused by reaction with ink, but the content of the pre-treatment is not particularly limited. Also, an example of the post-processing unit includes a unit that performs processing for binding multiple sheets having images formed thereon, but the content of the post-processing is not particularly limited, either.

The liquid discharge apparatus 1 is an apparatus that performs printing by relatively moving the ink discharge head and the sheet material, but is not limited thereto. Alternatively, the liquid discharge apparatus 1 may be a serial type apparatus that moves the ink discharge head, a line type apparatus that does not move the ink discharge head, and the like.

The "ink discharge head" is a functional component that discharges and injects ink from the discharge holes (nozzles). As an energy source for discharging ink, it may be possible to use discharge energy generation means such as a piezoelectric actuator (laminated piezoelectric element and thin film piezoelectric element), a thermal actuator using an electrothermal conversion element such as a heat generating resistor, and an electrostatic actuator constituted by a vibrating plate and a counter electrode, but the discharge energy generation means used by the "ink discharge head" is not particularly limited.

<Example of Hardware Configuration of DFE 2>

Next, a hardware configuration of the DFE 2 is explained with reference to FIG. 3. FIG. 3 is a block diagram for explaining an example of hardware configuration of the DFE 2.

As illustrated in FIG. 3, the DFE 2 includes a central processing unit (CPU) 21, read only memory (ROM) 22, a random access memory (RAM) 23, a solid state drive (SSD) 24, a hard disk drive (HDD) 25, a graphics processing unit GPU) 26, an interface (I/F) 27, a liquid crystal display (LCD) 28, and an operation unit 29, which are connected to be able to transmit and receive signals or data to and from one another via a system bus B1.

Among them, the CPU 21 controls the overall operation of the DFE 2. The ROM 22 stores programs used to drive the CPU 21 such as an initial program loader (IPL). The RAM 23 is used as a work area for the CPU 21.

The SSD 24 and the HDD 25 store various data such as programs. The GPU 26 is a processor that performs computational processing required for image rendering.

The interface 27 is an interface for connecting various external devices. In this case, the external devices are the image processing unit 3 and the printer 4. The interface 27 may also include a network interface function for data communication using the network.

The LCD 28 is a display apparatus that displays various kinds of information such as a cursor, a menu, a window, characters, images, or the like. The operation unit 29 includes input means such as: a keyboard provided with multiple keys for inputting characters, numerical values, various instructions, and the like; a pointing device for selecting and executing various instructions, selecting a processing target, moving the cursor, and the like; a touch panel display achieved with the LCD 28; and the like. The operation unit 29 is a unit for operating the DFE 2.

<Example of Hardware Configuration of Image Processing Unit 3>

Next, the hardware configuration of the image processing unit 3 is explained with reference to with reference to FIG. 4. FIG. 4 is a block diagram for explaining the hardware configuration of the image processing unit 3.

As illustrated in FIG. 4, the image processing unit 3 includes a CPU 31, a ROM 32, a RAM 33, an SSD 34, an HDD 35, a GPU 36, an application specific integrated circuit (ASIC) 37, a field-programmable gate array (FPGA) 38, and an interface 39, which are connected to be able to transmit and receive signals or data to and from one another via a system bus B2.

Among them, the CPU 31 controls the overall operation of the image processing unit 3. The ROM 32 stores programs used to drive the CPU 31 such as an IPL. The RAM 33 is used as a work area for the CPU 31. The SSD 34 and the HDD 35 store various data such as programs. The GPU 36 is a processor that performs computational processing required for image rendering.

The ASIC 37 is an integrated circuit that integrates circuits for multiple functions achieved by the image processing unit 3. The FPGA 37 is an integrated circuit that integrates circuits for multiple functions achieved by the image processing unit 3. The FPGA 37 can set or change the functions to be achieved after the integrated circuit is manufactured.

The interface 39 is an interface for connecting various external devices. In this case, the external devices are the DFE 2, the printer 4, and the like. The interface 39 may also include a network interface function for data communication using the network.

<Example of a Functional Configuration DFE 2 and Image Processing Unit 3>

Next, the functional configuration of the DFE 2 and the image processing unit 3 is explained with reference to FIG. 5. FIG. 5 is a block diagram for explaining the functional configuration of the DFE 2 and the image processing unit 3.

As illustrated in FIG. 5, the image processing unit 3 includes a first image obtaining unit 301, a second image generating unit 302, a read image obtaining unit 303, a deformation amount detection unit 304, a correction value obtaining unit 305, and a correcting unit 306. These functions are achieved by the CPU 31 executing a predetermined program, or by the ASIC 37, the FPGA 38, or the like.

The first image obtaining unit 301 receives and obtains raster image data from the DFE 2. The obtained raster image data is output to the second image generating unit 302.

The second image generating unit 302 generates the mark-attached raster image data obtained by adding the predicted marks to the raster image data received from the first image obtaining unit 301. The second image generating unit 302 outputs the generated mark-attached raster image data to the deformation amount detection unit 304 or the printer 4.

For example, in a case where the correction of the image according to the embodiment is not performed, the second image generating unit 302 outputs the mark-attached raster image data to the printer 4. In a case where the correction of the image according to the embodiment is performed, the second image generating unit 302 outputs the mark-attached raster image data to the deformation amount detection unit 304.

The read image obtaining unit 303 receives and obtains, from the sensor 425, the read image data read by the sensor 425 from the image formed on the sheet on the basis of the mark-attached raster image data.

The deformation amount detection unit 304 detects, through calculation, the amount of deformation of the sheet on the basis of the mark-attached raster image data and the read image data.

In this case, the amount of ink attached to the sheet differs depending on the size of area or the density of the image formed on the sheet. Depending on the amount of ink that has adhered to the sheet, the amount of deformation (the amount of expansion-and-contraction) of the sheet due to heating by the drying unit 43 or cooling by the cooling unit 44 may differ. The deformation amount detection unit 304 calculates the difference, in the position, the size, and the like, between the marks in the mark-attached raster image data and the marks in the read image data, and the deformation amount detection unit 304 can detect the amount of deformation of the sheet on the basis of this difference. These marks are explained separately with reference to FIG. 17.

The sensor 425 reads the image as RGB image data, but the read image data may be converted into CMYK image data to allow comparison with mark-attached raster image data, i.e., CMYK image data, to be readily performed. This conversion may be performed by the sensor 425 or the read image obtaining unit 303. However, even if the read image data is RGB image data and the mark-attached raster image data is CMYK image data, the amount of deformation can be detected because the difference in the position, the size, and the like of the marks can be calculated. In a case where RGB image data prior to conversion into CMYK image data by the DFE 2 is adopted as first image data, the first image data and the read image data can be compared as RGB image data to detect the amount of deformation. Further, the sensor 425 may obtain monochrome image data. In such a case, the difference in the position, the size, and the like of the marks can be calculated on the basis of the monochrome image data.

The correction value obtaining unit 305 obtains, through calculation, the correction values on the basis of the amount of deformation of the sheet detected by the deformation amount detection unit 304. The correction values are output to the DFE 2.

In this case, the DFE 2 includes a correction value storage unit 21. The functions of the correction value storage unit 21 are achieved by the SSD 24, the HDD 25, or the like of FIG. 3. The correction value storage unit 21 can receive and store the correction value obtaining unit 305 of the image processing unit 3.

The correcting unit 306 obtains the correction values obtained by the correction value obtaining unit 305 by referring to the correction value storage unit 21 of the DFE 2, and generates the corrected data by correcting either the raster image data or the mark-attached raster image data on the basis of this correction values. The DFE 2 outputs the corrected data to the printer 4. In the present embodiment, for example, a configuration in which the correction value storage unit 21 is provided in the DFE 2 is explained, but the present embodiment is not limited thereto. For example, the image processing unit 3 may have the functions of the correction value storage unit 21, and an external apparatus may have the functions of the correction value storage unit 21.

The ink discharging unit 423 of the printer 4 (se FIG. 2) forms an image by discharging ink to the sheet on the basis of any one of the mark-attached raster image data received from the second image generating unit 302 or the corrected data received from the correcting unit 306. For example, in a case where the correction according to the embodiment is not performed, the ink discharging unit 423 discharges ink on the basis of the mark-attached raster image data. In contrast, in a case where the correction of the image according to the embodiment is performed, the ink discharging unit 423 discharges ink on the basis of the corrected data.

One or more of the functions of the image processing unit 3 explained above may be provided in the DFE 2 or the printer 4. Alternatively, one or more of the functions of the image processing unit 3 may be provided in the DFE 2 and the printer 4 in a distributed manner.

<Operation Example of Liquid Discharge Apparatus 1>

Next, the operation of the liquid discharge apparatus 1 is explained with reference to FIG. 6 to FIG. 8.

(Example of Overall Configuration)

FIG. 6 is a flowchart for explaining an example of overall operation of the liquid discharge apparatus 1.

First, in step S61, the liquid discharge apparatus 1 obtains, through calculation, the correction values, and stores the obtained correction values into the DFE 2.

Next, in step S62, the liquid discharge apparatus 1 executes the corrected image formation process using the obtained correction values.

In this manner, the liquid discharge apparatus 1 can form, on a sheet, an image corrected using the previously obtained correction values.

(Example of Correction Value Obtaining Operation)

Next, FIG. 7 is a flowchart for explaining an example of the correction value obtaining operation of the liquid discharge apparatus 1. In FIG. 7, the operation of step S61 in the overall operation illustrated in FIG. 6 is explained in detail.

First, in step S71, the first image obtaining unit 301 of the image processing unit 3 obtains raster image data by receiving the raster image data from the DFE 2. The obtained raster image data is output to the second image generating unit 302.

Next, in step S72, the second image generating unit 302 generates the mark-attached raster image data obtained by adding the predetermined marks to the raster image data received from the first image obtaining unit 301. The second image generating unit 302 outputs the generated mark-attached raster image data to the printer 4.

Next, in step S73, the ink discharging unit 423 of the printer 4 discharges ink to the sheet on the basis of the mark-attached raster image data received from the second image generating unit 302 to form an image on the sheet.

Next, in step S74, the sensor 425 of the printer 4 reads the image formed on the sheet on the basis of the mark-attached raster image data, and outputs the image to the read image obtaining unit 303.

Next, in step S75, the deformation amount detection unit 304 detects, through calculation, the amount of deformation of the sheet on the basis of the mark-attached raster image data and the read image data received via the read image obtaining unit 303.

Next, in step S76, the correction value obtaining unit 305 obtains, through calculation, the correction values on the basis of the amount of deformation of the sheet detected by the deformation amount detection unit 304, and outputs the obtained correction values to the DFE 2.

Next, in step S77, the correction value storage unit 21 of the DFE 2 stores the correction values received from the correction value obtaining unit 305.

In this manner, the liquid discharge apparatus 1 can obtain and store the correction values.

(Example of a Corrected Image Formation Operation)

Next, FIG. 8 is a flowchart for explaining an example of the corrected image formation operation of the liquid discharge apparatus 1. In FIG. 8, the operation of step S62 in the overall operation illustrated in FIG. 6 is explained in detail.

In FIG. 8, a term "page" is used. In the embodiment, a page means a single surface of a sheet. In a case where multiple sheets are printed with single-sided printing for forming an image on a single surface of each sheet, "the 1st page" means a front surface of the first sheet of multiple sheets. In a case where a single sheet is printed with duplex printing for forming images on both surfaces of the sheet, "the 1st page" means the front surface of the sheet. In a case where multiple sheets are printed by duplex printing, "the 1st page" means the front surface of the first sheet of multiple sheets.

However, a term "subsequent page" indicates a page having an image formed thereon subsequently in the order of image formation. The order of image formation changes due to inter-leaf duplex printing, and therefore, the "subsequent page" is not always a subsequent page in a print job. The inter-leaf duplex printing is an image forming method in which an image starts to be formed on a subsequent sheet in a time period between image formation on the front surface and image formation on the back surface of a sheet immediately preceding the subsequent sheet.

In FIG. 8, first, in step S81, the DFE 2 outputs, to the image processing unit 3, (i) the correction values corresponding to raster image data based on which an image is to be formed on the 1st page of a sheet, and (ii) the raster image data corresponding to the correction values.

Next, in step S82, the correcting unit 306 of the image processing unit 3 receives the correction values and the raster image data from the DFE 2, and corrects the raster image data on the basis of the correction values. The corrected data is output to the printer 4.

Next, in step S83, the printer 4 forms an image on the sheet on the basis of the corrected data.

Next, in step S84, the DFE 2 determines whether to end the image formation.

In step S84, in a case where it is determined to end the image formation (step S84, Yes), the operation is ended. In contrast, in a case where it is determined not to the end image formation (step S84, No), the DFE 2 outputs, to the image processing unit 3, the correction values of the "subsequent page" and the raster image data corresponding to the correction values in step S85. Thereafter, returning back to step S82, processing in step S82 and subsequent steps are repeated.

In this manner, the liquid discharge apparatus 1 can perform the corrected image formation using the previously obtained correction values.

The liquid discharge apparatus 1 may execute the correction value obtaining operation of FIG. 7 as a test printing prior to a production printing, and may execute the corrected image formation operation of FIG. 8 as a production printing of a print job for which the test printing has been performed according to the operation of FIG. 7. In this case, the test printing is a printing for forming an image on a recording medium that is not used as a printed matter, and the test printing corresponds to a trial printing. In contrast, the production printing is a printing for forming an image on a recording medium that is used as a printed matter.

The correction values for each page are obtained by using (i) an image forming result that is generated by a test printing of the print job designated by the user and (ii) read image data of the sheet, and when a production printing of the same print job is performed, corrected image formation is performed by using the saved correction values for each page of all of the pages. Hereinafter, the corrected image formation may be simply referred to as a correction.

With regard to the correction values for each page, in a case of a print job for a single-sided printing, the correction values of a single surface having an image formed thereon are obtained. In a case of a print job for duplex printing, the correction values of pages on the front surface and the back surface having images formed thereon are obtained. The correction method and the test printing are set on a job setting screen for configuring settings for each print job. In this case, the front surface is an example of a first surface, and the back surface is an example of a second surface.

<Example of Correction Value Obtaining Operation Using Test Printing>

(Overall Operation)

The liquid discharge apparatus 1 can execute test printing before production printing for each print job, and obtain the correction values for each page. The liquid discharge apparatus 1 obtains the correction values and thereafter performs production printing by selecting a print job for which a test printing has been finished, so that the liquid discharge apparatus 1 can form images of which the positions on respective pages have been corrected by the correction values obtained from the test printing.

In response to a user's instruction on the operation screen of the DFE 2, the liquid discharge apparatus 1 executes the test printing of the print job and the production printing of the print job at different points in time.

The liquid discharge apparatus 1 performs test printing in response to an execution instruction on an operation screen for configuring image position correction in a job setting screen for configuring settings of a print job selected from the list screen of print jobs received by the DFE 2.

In the print job setting, the user can also configure a setting of image position correction of the print job, a setting for choosing which of single-sided printing or duplex printing as a print condition of the print job, a setting of a print mode (productivity, image quality), a setting of the type of recording medium, a setting of pre-application condition (whether pre-treatment liquid application is performed), and the like.

The setting of the image position correction for correcting image positions of the print job is configured with a predetermined user interface (UI). The liquid discharge apparatus 1 displays this UI on a screen of the DFE 2, a PC (i.e., a user terminal), the printer 4, or the like.

In the setting of the image position correction, "correction ON", selection of type correction, and "correction OFF" can be set. In the case of "correction ON", the setting of the image position correction by test printing is enabled. The liquid discharge apparatus 1 obtains the correction values by performing the test printing according to the configured condition. The DFE 2 of the liquid discharge apparatus 1 associates the obtained correction values with identification information of the corresponding page.

The liquid discharge apparatus 1 performs the test printing for each print job. When the correction values are once registered for each print job, the liquid discharge apparatus 1 can perform correction by using the correction values associated with the print job when the print job is executed again, as long as the setting of the image position correction is not changed. Note that, even if the DFE 2 receives the print job of the same file, the print job is treated as a different print job if the DFE 2 receives it at a different point in time.

The DFE 2 associates and saves a single setting of the image position correction and the correction values with any given print job. This is because the expansion-and-contraction rates of recording media during image formation are all different from one another, depending on a combination of settings of image position corrections (for example, whether the settings are configured for high quality printing with pre-treatment or high productivity printing without pre-treatment). In a case where the print job setting is changed, the DFE 2 registers the setting of the image position correction as another print job. Also, the DEF 2 may associate and display a combination of multiple patterns of settings of the image position corrections and the correction values with any given print job.

The liquid discharge apparatus 1 performs the production printing by using the correction values of the test printing that are saved via the screen for executing the print job with the DFE 2. In the data saved by the DFE 2, identification information of the print job, identification information of the page, and identification information of correction (or correction values) are associated with one another. During image formation, the DFE 2 transmits the associated correction values to the image processing unit 3.

(Setting Screen Example)

A screen transition from a list screen of print jobs to a print job setting screen of the DFE 2 is explained with reference to FIG. 9 to FIG. 12. FIG. 9 is a drawing illustrating an example of a list screen of print jobs. FIG. 10 to FIG. 12 are drawings illustrating examples of settings of image position correction screens. FIG. 10 illustrates a first example, FIG. 11 illustrates a second example, and FIG. 12 illustrates a third example.

When the DFE 2 receives a print job, the liquid discharge apparatus 1 causes the DFE 2 to display a job list screen 501 as illustrated in FIG. 9 on the LCD 28. The user selects multiple print jobs displayed as a list on the operation screen of the DFE 2 to configure the print job settings. The print job settings include not only the setting of the image position correction but also various settings such as a setting for choosing which of single-sided printing or both-sided printing and a setting of used color materials.

The user can instruct execution of image formation by touching a job execute button 502, and can cause the operation screen to transition to the print job setting screen by touching a job setting button 503. Also, the user can delete a print job by touching a job deletion button 504, and can retrieve data of a new print job by touching a job addition button 505.

When the job setting button 503 is touched, a property screen 510 for displaying various setting buttons of the print job opens up. The user touches the setting of the image position correction button 511 from among multiple items displayed on the property screen 510, so that an image position correction setting screen 520 as illustrated in FIG. 10 to FIG. 12 can be displayed.

The image position correction setting screen 520 includes an image position correction button 521 in a dropdown form and a test printing selection checkbox 522 for obtaining the correction values for each page. With the image position correction button 521, the user can select any one of "OFF", "For each page", or "For each medium" with respect to image position correction. "For each page" means control for storing and changing the correction values in units of pages. "For each medium" means control for changing the correction values for each of the sheet types of sheets or for each of the types of recording media.

FIG. 10 illustrates a case where "OFF" is selected with the image position correction button 521, and FIG. 11 illustrates a case where "For each page" is selected with the image position correction button 521.

When the test printing selection checkbox 522 is checked, test printing is executed, and the correction values for each page are associated with the print job in question and saved in the DFE 2. After the test printing selection checkbox 522 is checked, the test printing alone is executed before the production printing is executed. The production printing may be configured to be automatically performed subsequent to the test printing in a continuous manner. Also, "For each page" may be allowed to be selected with the image position correction button 521, after the test printing is executed.

Examples of scenes in which the user selects a correction method include: a scene in which the user selects "For each page" when the expansion-and-contraction rate changes due to the type of recording medium, the sheet type of sheet, or the like; and a scene in which a print job including image formation to multiple recording media with different expansion-and-contraction rates is executed. In this case, it is not necessary to execute the test printing for each page.

In use scenes such as when correction for each page is desired to be performed accurately or when a print job for image formation to recording media having greatly different expansion-and-contraction rates for respective pages is executed, the correction of "For each page" is preferably selected. Further, in a case where the arrangement of the front and back sides of a postcard or the like is desired to be more accurately corrected, the most suitable item from among the items displayed in a front-and-back sides position adjustment box 523 is preferably selected. The "front-and-back sides position adjustment" means real time front-and-back sides positioning processing that is performed in real time during execution of image forming by the liquid discharge apparatus 1 (which is referred to as real time front-and-back sides positioning). The front-and-back sides position adjustment can be selected only in the case of duplex printing. In a case where an "edge of sheet" or a "detection mark" is selected in the front-and-back sides position adjustment box 523, correction is performed so as to position the back surface according to the front surface. The edge of a sheet corresponds to an edge of a recording medium, and the detection mark corresponds to a mark in mark-attached raster image data.

In a case where the "detection mark" is selected in the setting of the image position correction, and where a margin or no-cutting is set in the print job setting, a collision indication may be displayed. The collision indication means an indication for notifying that the settings are colliding or overlapping.

In a case where "For each page" or "For each medium" is selected with the image position correction button 521, a number-of-copies button 524 and the items in the front-and-back sides position adjustment box 523 become selectable.

When the number of copies is changed by the number-of-copies button, the DFE 2 calculates averages of the coordinates of four detection marks on the corresponding pages of multiple copies constituted by multiple recording media. The DFE 2 may store the correction values for respective pages of multiple copies and apply the stored correction values to correction.

In the print job for which the test printing is performed once, the DFE 2 displays characters "adjusted" to indicate that the correction values for each page have already been obtained for this print job. In a case where the same job is selected and executed again later, the DFE 2 can apply the correction values associated with this print job.

In a case where "OFF" is selected with the image position correction button 521, and any one of "edge of sheet" or "detection mark" in the item in the front-and-back sides position adjustment box 523 is selected, the DFE 2 determines that the settings are colliding, and displays a collision screen 530 for resolving the collision as illustrated in FIG. 12.

(Details of Operation)

An operation for obtaining the correction values using test printing by the liquid discharge apparatus 1 is explained. In the test printing of duplex printing, the liquid discharge apparatus 1 executes the following operations (1) to (4) in this order.

(1) Image is Formed on Front Surface of Recording Medium

The liquid discharge apparatus 1 forms an image by adding marks on the front surface. In this case, the liquid discharge apparatus 1 does not execute the position correction processing of images. The marks are added to the positions that are 3 mm away from the sheet edges.

(2) Front Surface of Recording Medium is Read to Obtain Correction Values

The liquid discharge apparatus 1 reads the front surface of the recording medium with the sensor 425, and the DFE 2 stores the coordinates (x0y0, x1y1, x2y2, x3y3) of the four marks on each page. In the detection of the coordinates of the marks, the DFE 2 detects the center of gravity of a corner portion of each of the four marks. The DFE 2 searches a central point of an edge where the mark changes from black to white, and adopts the found central point as the center of gravity. The DFE 2 performs similar processing even in a case where the correction values are obtained from the back surface of the recording medium. As a result, the DFE 2 can obtain the amount of deviation (including distortion of the image and shift in position) on the front surface without correction. In this case, the deviation is caused by, e.g., expansion-and-contraction of the recording medium due to the ink application performed for a single time and the drying performed for a single time. The DFE 2 applies the amount of deviation based on the coordinates of the four marks to the back surface as the correction values.

In this case, the raster image data of the front surface and the read result are not compared. Only the position information of the marks on the front surface of the read result is transmitted to the DFE 2, and this is reflected on the back surface to form an image on the back surface. When the position information is applied to the back surface, the correction values and the coordinates are changed by the printer 4. With the coordinates that are inverted top-to-bottom and left-to-right, the correction values are derived by the printer 4. The printer 4 inverts the coordinates of the marks and holds the inverted coordinates. The coordinates that are not inverted are used by single-sided printing.

(3) Image is Formed on Back Surface of Recording Medium

The liquid discharge apparatus 1 forms an image on the back surface of the recording medium after marks are added and correction (distortion correction and correction of shift in position) processing according to the front surface is executed on the basis of deviation from the coordinates of the marks on the front surface of the recording medium. This is because, when the marks are added after the correction is performed instead of performing correction after the marks are added, the marks are added to the non-distorted original positions, and accordingly, it is impossible to find the amount of distortion.

(4) Back Surface of Recording Medium is Read to Obtain Correction Values

In the liquid discharge apparatus 1, the sensor 425 reads the back surface of the recording medium, and the DFE 2 compares the read result of the back surface with the raster image data of the front surface of the recording medium to obtain the correction values of the front surface. Also, the DFE 2 of the liquid discharge apparatus 1 compares the read result of the back surface with the read result of the front surface to obtain the correction values of the back surface. Therefore, the amount of deviation (including distortion of the image and shift in position) of the back surface can be detected. In this case, the deviation is caused by, e.g., expansion-and-contraction of the recording medium due to application of ink performed twice and drying performed twice.

When the correction values of the back surface are obtained, the correction according to the front surface has already been performed, and accordingly, even though the detected amount of deviation is the amount of deviation of the back surface, it also includes the amount of deviation of the front surface. The DFE 2 obtains the coordinates of the four detection marks as the correction values of the front surface of the same recording medium as the recording medium of which the back surface has been read. The DFE 2 obtains the coordinates of the four detection marks as the correction values of the back surface for the second time. When test printing is performed for multiple copies, the DFE 2 calculates an average of the coordinates of four detection marks on the corresponding pages of multiple copies. For example, in a case where test printing is performed for three copies, the DFE 2 calculates and stores, for each of the four marks, average value of the coordinates of the mark on three sheets, i.e., the front of P1 of the first copy, the front of P1 of the second copy, and the front of P1 of the third copy.

With regard to the expansion-and-contraction (caused by ink application or drying) of the recording medium that causes the deviation, the deviation that occurs when the front surface is read in the above operation (2) is caused by the ink application performed for a single time and the drying performed for a single time. In contrast, the deviation that occurs, when the back surface is read in the above operation (4), is caused by the ink application performed for two times and the drying performed for two times, which further change the expansion-and-contraction. The correction values of the front surface are obtained from the result of the operation (4), and the correction values of the back surface are obtained from the results of the operation (2) and the operation (4). The correction values used in the production printing are the coordinates of the positions of the marks on the front and back sides obtained in the operation (4).

The DFE 2 saves the coordinates of the positions of the marks, and transmits the coordinates of the positions to the image processing unit 3, and the image processing unit 3 determines the correction values to perform the correction. The correction values include the coordinates of the original positions of the marks obtained from the read image data, the difference values calculated by comparison with the original data, average values obtained by averaging the coordinates of the positions on the corresponding pages of multiple copies, or the like.

In the test printing of the single-sided printing, the liquid discharge apparatus 1 executes the following operations (a) to (b) in this order.

(a) Image is Formed on Front Surface of Recording Medium

The liquid discharge apparatus 1 forms an image by adding marks to the front surface of the recording medium. In this case, the liquid discharge apparatus 1 does not perform position correction processing of images. The marks are added to the positions that are 3 mm away from the sheet edges.

(b) Front Surface of Recording Medium is Read to Obtain Correction Values

In the liquid discharge apparatus 1, the sensor 425 reads the front surface of the recording medium, and the DFE 2 stores the coordinates of the four marks (x0y0, x1y1, x2y2, x3y3) for each page. The DFE 2 compares the read result of the front surface with the raster image data of the front surface to derive the amount of deviation. Accordingly, the amount of deviation of the front surface (including distortion of the image and shift in position) without correction is detected. In this case, the deviation is caused by, e.g., expansion-and-contraction of the recording medium due to the ink application performed for a single time and the drying performed for a single time. The DFE 2 saves, for each page, the correction values only for the front surface, and the liquid discharge apparatus 1 uses the saved correction values for the production printing.

FIG. 13 is a flowchart illustrating an example of correction value obtaining operation using test printing by the liquid discharge apparatus 1. The liquid discharge apparatus 1 starts the operation of FIG. 13 in response to an execution instruction of test printing for each print job from the user.

First, in step S131, the printer 4 of the liquid discharge apparatus 1 determines whether the print job of the test printing is single-sided printing.

In step S131, in a case where it is determined that the print job of the test printing is single-sided printing (step S131, Yes), the printer 4 of the liquid discharge apparatus 1 forms an image on the front surface of the recording medium having the marks added thereto in step S132.

Next, in step S133, the sensor 425 of the liquid discharge apparatus 1 reads the front surface of the recording medium having the marks added thereto.

Next, in step S134, the DFE 2 of the liquid discharge apparatus 1 obtains and saves the coordinates of the positions of the marks on each page of the front surface from the read images.

Next, in step S135, the DFE 2 of the liquid discharge apparatus 1 transmits the position information (test printing result) saved in the DFE 2 to the printer 4. Then, the printer 4 of the liquid discharge apparatus 1 obtains and saves a difference obtained by comparing the coordinates of the positions of the marks in the read image of the front surface with the coordinates of the positions of the marks added to the raster image data prior to image formation. The difference value between the coordinates of the positions of the marks in the read image that is read from the front surface and the coordinates of the positions of the marks added to the raster image data prior to image formation may be calculated by the DFE 2.

The operations from step S131 to step S134 are operations performed by the liquid discharge apparatus 1 on the basis of test printing. The operation of step S135 is an operation performed by the liquid discharge apparatus 1 on the basis of production printing.

In contrast, in a case where it is determined that the print job of the test printing is not single-sided printing in step S131 (step S131, No), the printer 4 of the liquid discharge apparatus 1 forms an image on the front surface of the recording medium having the marks added thereto in step S136.

Next, in step S137, the sensor 425 of the liquid discharge apparatus 1 reads the front surface of the recording medium having the marks added thereto.

Next, in step S138, the DFE 2 of the liquid discharge apparatus 1 obtains and saves the coordinates of the positions of the marks from read images that are read from respective pages on the front surfaces.

Next, in step S139, the DFE 2 of the liquid discharge apparatus 1 obtains and saves a difference obtained by comparing the coordinates of the positions of the marks in the read image that is read from the front surface with the coordinates of the positions of the marks added to the raster image data prior to image formation.

Next, in step S140, the printer 4 of the liquid discharge apparatus 1 adds marks, performs correction using the obtained difference, and then forms the image on the back surface of the recording medium.

Next, in step S141, the sensor 425 of the liquid discharge apparatus 1 reads the back surface of the recording medium having marks added thereto.

Next, in step S142, the liquid discharge apparatus 1 obtains and saves the coordinates of the positions of the marks from read images that are read from respective pages on the back surfaces.

Next, in step S143, the DFE 2 of the liquid discharge apparatus 1 transmits, to the printer 4, position information (test printing result) about the marks on the back surface saved by the DFE 2. Then, the printer 4 of the liquid discharge apparatus 1 obtains and saves a difference obtained by comparing the coordinates of the positions of the marks on the read image that is read from the back surface with the coordinates of the positions of the marks added to the raster image data prior to image formation. The difference value between the coordinates of the positions of the marks on the read image that is read from the back surface and the coordinates of the positions of the marks in the raster image data prior to image formation may be calculated by the DFE 2.

The operation from S136 to step S142 is an operation performed by the liquid discharge apparatus 1 on the basis of test printing, and the operation of step S143 is an operation performed by the liquid discharge apparatus 1 on the basis of production printing.

In this manner, the liquid discharge apparatus 1 can obtain the correction values using test printing.

FIG. 14 is a drawing illustrating an example of a combination list in corrected image formation mode. An item (b) displayed in FIG. 14 corresponds to the correction according to the above operation (2) and operation (4), which is an operation of the liquid discharge apparatus 1 in test printing of duplex printing. An item (c) displayed in FIG. 14 is a real time front-and-back sides positioning mode, and corresponds to an operation for performing correction on the basis of the correction values of the test printing for the front surface and on the basis of the (corrected) read result of the front surface of the production printing for the back surface.

In the real time front-and-back sides positioning of the item (c), when the user selects marks, the DFE 2 notifies to the image processing unit 3 an instruction as to where marks are to be added. The image processing unit 3 performs image forming control by adding the marks. The image processing unit 3 of the liquid discharge apparatus 1 calculates the correction values to correct the back surface in accordance with the read result of the front surface.

When the correction using the edges of the recording medium is selected in the real time front-and-back sides positioning of the item (c), the image processing unit 3 corrects the back surface by reading the edges of the recording medium without adding any mark. In the correction of the edges of the recording medium, the difference between the vertical and horizontal widths of the recording medium used for image formation and the sizes of the recording medium of the read data obtained by reading the printed front surface is calculated.

The correction of the back surface (i.e., making front-and-back sides match with each other) include the following two cases.

(A) The front surface of production printing is read (i.e., marks printed on the front surface on the recording medium are read or the edges of the recording medium are read), and the back surface is corrected to make the back surface match with the front surface (real time front-and-back sides positioning).

(B) The above (A) is executed in test printing in advance, and the amount of correction obtained during the execution is saved. The correction is performed with the saved amount of correction. During production printing, it is unnecessary to print the marks.

In addition, for the correction method of the back surface, methods other than the method illustrated in FIG. 14 may be selected.

(Correction Values)

Specific examples of correction values (coordinates) obtained in test printing are explained. In other words, the correction values obtained in test printing include difference values calculated, for each page of the print jobs, by comparing the marks formed on the recording medium and the marks in the original raster image data.

The correction values include a main scanning position correction value, a sub-scanning position correction value, a main scanning magnification error correction value, a sub-scanning magnification error correction value, a main scanning left-side deviation amount correction value, a main scanning right-side deviation amount correction value, a sub-scanning top-side deviation amount correction value, and a sub-scanning bottom-side deviation amount correction value.

The main scanning position is a position in a direction perpendicular to the conveying direction of an image. The sub-scanning position is a position in the conveying direction of the image. The main scanning magnification is a magnification of the image in the main scanning direction. The sub-scanning magnification is a magnification of the image in the sub-scanning direction. The main scanning left-side deviation amount correction value, the main scanning right-side deviation amount correction value, the sub-scanning top-side deviation amount correction value, and the sub-scanning bottom-side deviation amount correction value are correction values for correcting distortion of the image in the upward (top), downward (bottom), left, and right directions.

(Front-and-Back Sides Positioning)

The front-and-back sides positioning is performed during production printing for a print job of duplex printing of which test printing has been finished, where the setting of the real time front-and-back sides positioning is ON.

The liquid discharge apparatus 1 forms an image on the front surface of the recording medium while performing correction with the obtained correction values according to the operation (4) for obtaining the correction values using test printing. Thereafter, the sensor 425 reads the front surface of the recording medium. Thereafter, the liquid discharge apparatus 1 forms an image on the back surface while correcting the image on the back surface according to the read result obtained by reading the image formed on the front surface of the production printing. In this case, in a manner similar to the operation (3) for obtaining the correction values using test printing, the correction is performed upon adding marks in order to detect distortion. Thereafter, the sensor 425 of the liquid discharge apparatus 1 reads the back surface of the recording medium. However, in the present embodiment, even though the read data obtained by reading the back surface is obtained, the read data is not used for position correction.

(Correction Operation Example of Production Printing)

FIG. 15 is a flowchart illustrating an example of an operation for performing correction using the correction values by the liquid discharge apparatus 1 in the production printing. The liquid discharge apparatus 1 starts the operation of FIG. 15 after test printing for each print job is executed.

First, in step S151, the DFE 2 of the liquid discharge apparatus 1 saves the obtained correction values by test printing.

Next, in step S152, the liquid discharge apparatus 1 starts execution of the production printing of the print job.

Next, in step S153, the liquid discharge apparatus 1 determines whether the setting of correction is ON or not.

In a case where it is determined that the setting of correction is ON in step S153 (step S153, Yes), the liquid discharge apparatus 1 corrects neither the front surface nor the back surface, or performs correction by applying the predetermined correction values to all the pages in step S154. Then, the liquid discharge apparatus 1 ends the operation after the correction is finished.

In contrast, in a case where it is determined that the setting of correction is not ON in step S153 (step S153, No), the liquid discharge apparatus 1 determines whether the setting of the correction is image position correction for each page in step S155.

In a case where it is determined that the setting of the correction is the page-based image position correction in step S155 (step S155, Yes), the liquid discharge apparatus 1 determines whether the real time front-and-back sides positioning setting is selected in step S156.

In a case where it is determined that the real time front-and-back sides positioning setting is selected in step S156 (step S156, Yes), the liquid discharge apparatus 1 corrects each page by using the correction values for each page that are previously obtained by test printing in step S157. On a single surface in the case of single-sided printing and on both surfaces, i.e., the front-side surface and the back-side surface, in the case of duplex printing, the liquid discharge apparatus 1 forms an image while performing correction for each page by using previously obtained correction values. After image formation has been finished, the liquid discharge apparatus 1 ends the operation.

In contrast, in a case where it is determined that the real time front-and-back sides positioning setting is not selected in step S156 (step S156, No), the liquid discharge apparatus 1 determines whether the real time front-and-back sides positioning using marks is performed in step S158.

In a case where it is determined that the real time front-and-back sides positioning using marks is performed in step S158 (step S158, Yes), the liquid discharge apparatus 1 performs correction by using the correction values for each page that are previously obtained by test printing, and thereafter forms an image on the front surface of the recording medium upon performing image processing for adding marks in step S159. Thereafter, the liquid discharge apparatus 1 performs correction according to the mark position detection result of the front surface obtained in production printing, and forms an image on the back surface of the recording medium (the real time front-and-back sides positioning).

In contrast, in a case where it is determined that the real time front-and-back sides positioning using marks is not performed in step S158 (step S158, No), the liquid discharge apparatus 1 forms an image on the front surface while performing correction using the correction values for each page that are previously obtained by test printing in step S160. Thereafter, the liquid discharge apparatus 1 forms an image on the back surface (the real time front-and-back sides positioning) while performing correction according to the detection result obtained from the recording medium edges on the front surface of production printing.

Also, in a case where it is determined that the setting of the correction is not the page-based image position correction in step S155 (step S155, No), the liquid discharge apparatus 1 performs correction using, for all the pages of the print job, the correction values that are set in advance according to the types of the recording medium in step S161. In this case, the real time front-and-back sides positioning is selectable. In a case where the real time front-and-back sides positioning is selected, image formation to the back surface is corrected according to image formation to the front surface. In this case, which of the marks and the recording medium edges are used can be selected.

In this manner, the liquid discharge apparatus 1 can execute the correction processing using the correction values in production printing.

FIG. 16 is a sequence chart illustrating an example of correction operation using the correction values by the liquid discharge apparatus 1.

In FIG. 16, first, when a print job is transmitted from the PC 5 to the liquid discharge apparatus 1 in response to a user's instruction for turning ON the liquid discharge apparatus 1, the DFE 2 of the liquid discharge apparatus 1 generates job identification information in step S171.

The operations up until step S171 correspond to the test printing execution operation and the page-based correction values obtaining operation.

Next, after the user inputs a print job setting and a correction value setting, an execution instruction for test printing is given. In response to this execution instruction, the DFE 2 of the liquid discharge apparatus 1 generates page identification information of the print job in step S172, and thereafter starts execution of test printing of the print job. The DFE 2 transmits the raster image data and the page identification information of the print job to the image processing unit 3.

Next, in step S173, the image processing unit 3 of the liquid discharge apparatus 1 performs image forming control using the raster image data.

Next, in step S174, the printer 4 of the liquid discharge apparatus 1 forms an image on the basis of the raster image data, and the sensor 425 of the liquid discharge apparatus 1 reads the image formed on the recording medium, and transmits the read data to the image processing unit 3.

Next, in step S175, the image processing unit 3 of the liquid discharge apparatus 1 obtains the correction values using the marks or the recording medium edges for each page, and transmits the correction values associated with the page identification information to the DFE 2.

Next, in step S176, the DFE 2 of the liquid discharge apparatus 1 saves the correction values for each piece of page identification information in association with the job identification information.

The operations from step S172 to step S176 correspond to the test printing execution operation and the page-based correction values obtaining operation.

Thereafter, in response to the user's execution instruction of the production printing, the DFE 2 transmits the raster image data, the page identification information, and the correction values associated with the page identification information to the image processing unit 3. The user givens an execution instruction of production printing for printing the print job for which the test printing has been executed and of which the correction values have been obtained. The production printing may be automatically performed after the test printing. The user can also give an execution instruction of production printing upon selecting a print job in the past.

Next, in step S177, the image processing unit 3 of the liquid discharge apparatus 1 performs correction for each page, on the basis of the raster image data, the page identification information, and the correction values associated with the page identification information that are received from the DFE 2.

Next, in step S178, the image processing unit 3 of the liquid discharge apparatus 1 performs image forming control using the corrected data.

Next, in step S179, the printer 4 of the liquid discharge apparatus 1 forms an image on the basis of the corrected data, and the sensor 425 of the liquid discharge apparatus 1 reads an image formed on the recording medium, and transmits the read data to the image processing unit 3.

Next, in a case where the real time front-and-back sides positioning setting is turned ON in the correction setting, the image processing unit 3 of the liquid discharge apparatus 1 corrects the raster image data of the back surface in duplex printing, in accordance with the read result of the front surface of the corresponding page in step S180.

Next, in step S181, the image processing unit 3 of the liquid discharge apparatus 1 performs image forming control of the back surface using the corrected data.

Next, in step S182, the printer 4 of the liquid discharge apparatus 1 forms an image on the basis of the corrected data, and the sensor 425 of the liquid discharge apparatus 1 reads the image formed on the recording medium, and transmits the read data to the image processing unit 3. Note that the read data of the back surface is not used for the correction processing according to the present embodiment, but is used for another processing such as defect detection.

The operation from step S177 to step S182 corresponds to the execution operation of the production printing using the correction values for each page.

In this manner, the liquid discharge apparatus 1 can perform the correction using the correction values. The correction is performed for each page by the test printing and the production printing, so that even in a case where the amount of deformation of sheet is different from page to page, an appropriate image can be obtained.

(Application of Correction Values During Inter-Leaf Duplex Printing)

Hereinafter, a method for determining which of the front surface or the back surface an image is formed and applying the stored correction values during inter-leaf duplex printing is explained.

The liquid discharge apparatus 1 forms images alternately on the front surface and the back surface in the following order and adds identification information to respective pages during inter-leaf duplex printing. The liquid discharge apparatus 1 sorts the correction values in the order of image formation, and the DFE 2 saves the sorted correction values. Hereinafter, for example, "front 1" means the 1st page on the front surface, "id" means identification information, "id1" means "1" is added as identification information, and "page 1" means the 1st page.

Print: front 1 (id1), front 2 (id3), front 3 (id5), back 1 (id2), front 4 (id7), back 2 (id4), front 5 (id9), back 3 (id6), back 4 (id8), back 5 (id10)

Correction values: page 1 (id1), page 2 (id3), . . . page 10 (id10)

The DFE 2 generates identification information of pages, and saves the identification information in association with the correction values for the respective pages. The DFE 2 transmits, in the order of pages, the raster image data and the correction value to the image processing unit 3.

During inter-leaf duplex printing, the image processing unit 3 of the liquid discharge apparatus 1 forms an image by sorting the raster image data and the correction values. Also, the image processing unit 3 of the liquid discharge apparatus 1 recognizes the front or the back of the recording medium on the basis of the identification information. For example, in a case where a number given as the identification information is an odd number, it is determined that the front surface is facing the image processing unit 3, and in a case where the number is an even number, it is determined that the back surface is facing the image processing unit 3.

In the case where the front surface is facing the image processing unit 3, the liquid discharge apparatus 1 receives, from the DFE 2, the correction values obtained from the test printing, and forms images by performing correction using the received correction values. In the case where the back surface is facing the image processing unit 3, the liquid discharge apparatus 1 forms images while performing the real time front-and-back sides positioning by using the correction values based on the amount of deviation obtained from the result of previous image formation (i.e., the front surface side of the same page of a given copy).

<Example of Marks Added to Raster Image Data>

Next, marks added to the raster image data by the second image generating unit 302 are explained with reference to FIG. 17. FIG. 17 is a drawing illustrating an example of marks added to the raster image data.

FIG. 17 illustrates an image 92 formed on a sheet 91. A partially enlarged view 94a illustrates an end portion 93a that is on the negative side in the X axis direction and that is on the positive side in the Y axis direction of the image 92. A partially enlarged view 94b illustrates an end portion 93b that is on the positive side in the X axis direction and that is on the positive side in the Y axis direction of the image 92.

As illustrated in the partially enlarged view 94a, an image of a mark 95a is formed in the end portion 93a. The mark 95a is a figure constituted by lines extending in the X axis direction and the Y axis direction.

Also, as illustrated in the partially enlarged view 94b, an image of a mark 95b is formed in the end portion 93b. Similarly to the mark 95a, the mark 95b is a figure constituted by lines extending in the X axis direction and the Y axis direction.

The raster image data image including the marks 95a and 95b added to the image 92 corresponds to the mark-attached raster image data. The marks added to the raster image data are not limited to the example illustrated in FIG. 17, and may be any mark such as a cross-shaped mark, so long as the position or deformation, or both of the position and the deformation, can be detected from an image in the X axis direction and the Y axis direction. In addition to adding marks to the raster image data, a characteristic portion of a sheet, such as an edge or a corner of the sheet, in read image data of the sheet may be recognized and used for detection of the position and deformation of the image.

<Example of Correction Values>

Next, the correction values are explained. The correction values are different depending on the print condition such as duplex printing or single-sided printing of the print job, and therefore, every time the print condition of the print job is changed, it is preferable that the correction values are obtained and stored in association with each of the print jobs. Hereinafter, the correction values for duplex printing and the correction values for single-sided printing are explained. The coordinates explained below correspond to the positions of pixels constituting an image.

(Duplex Printing)

In the case of duplex printing, a center coordinate $P_1$ ($x_1$, $y_1$) of the mark position in the mark-attached raster image data of which the image is to be formed on the front surface (i.e., the first surface) matches with a center coordinate $P_2$ ($x_2$, $y_2$) of the mark position in the mark-attached raster image data of which the image is formed on the back surface (i.e., the second surface). Accordingly, the correction values used for image formation on the front surface are obtained by geometric calculation. For example, $\Delta P(x_1-x_2, y_1-y_2)$, i.e., a difference value between (i) the center coordinate $P_1$ ($x_1$, $y_1$) of the mark position in the mark-attached raster image data of which the image is to be formed on the front surface (i.e., the first surface) and (ii) the center coordinate $P_2(x_2, y_2)$ of the mark position in the mark-attached raster image data of which the image is formed on the back surface (i.e., the second surface), corresponds to the correction values.

For example, $\Delta Q(x_1-x_2, y_1-y_2)$, such as a difference value between (i) a center coordinate $Q_1(x_1, y_1)$ of the mark position in the read image data of the back surface of the sheet of which the image is to be formed on the front surface (i.e., the first surface) and (ii) a center coordinate $Q_2(x_2, y_2)$ of the mark position in the read image data of the back surface of the sheet of which the image is formed on the back surface (i.e., the second surface), corresponds to the correction values.

(Single-Sided Printing)

In the case of the single-sided printing, the correction values used for image formation on the front surface are obtained by geometric calculation, on the basis of the center coordinates of the mark position in the mark-attached raster image data of which the image is to be formed on the front surface and the mark position in the read image data of the front surface of the sheet of which the image is formed on the front surface.

(Deformation of Image is Corrected)

Next, correction of deformation of an image is explained. FIG. 18A is a drawing illustrating coordinate points of mark-attached raster image data for explaining an example of a correction method of deformation of an image. FIG. 18B is a drawing illustrating coordinate points of read image data for explaining an example of a correction method of deformation of an image. In the example of FIGS. 18A and 18B, four coordinate points are arranged in the mark-attached raster image data, and four coordinate points are arranged in the read image data.

In the mark-attached raster image data illustrated in FIG. 18A, ideal coordinate points without deformation are obtained. In contrast, in the read image data illustrated in FIG. 18B, the position of the point B is shifted in position to the negative side in the X axis direction by 5 pixels and to the positive side in the Y axis direction by 5 pixels, due to deformation (expansion-and-contraction) of the sheet. Therefore, the deformation of the image can be corrected by performing geometric transformation operation of a rectangular image constituted by the coordinate points A, B, C, and D, so that the position of the point B is shifted in position to the positive side in the X axis direction by 5 pixels and to the negative side in the Y axis direction by 5 pixels.

In this manner, multiple coordinate points are arranged in each of the mark-attached raster image data and the read image data, and the deformation of the rectangular image constituted by the coordinates points is detected from shifts in position of the respective coordinate points. Then, the rectangular image is corrected so as to eliminate the deformation, so that the image to be formed on the sheet can be corrected.

<Effects of Liquid Discharge Apparatus 1>

Next, the effects of the liquid discharge apparatus 1 are explained with reference to FIG. 19 to FIG. 21. First, FIG. 19 is a drawing for explaining an example of an image forming result in a case where the correction according to the embodiment is not performed. FIG. 19 illustrates multiple pages of sheets on which images are formed, in which a page 111 indicates the 1st page, a page 112 indicates the 2nd page, and a page 113 indicates the 3rd page.

Depending on the image to be formed, the amount and distribution of ink that has adhered to a sheet varies, and accordingly, the expansion-and-contraction of the sheet is partially different. As a result, the shift in position and the deformation of the image may be different depending on the printed matter.

As illustrated in FIG. 19, on the page 111, the expansion-and-contraction increases according to the amount of ink that has adhered to the positive side in the X axis direction and the positive side in the Y axis direction. On the page 112, the expansion-and-contraction increases according to the amount of ink that has adhered to the negative side in the X axis direction and the positive side in the Y axis direction. On the page 113, the expansion-and-contraction increases according to the amount of ink that has adhered to the negative side in the X axis direction and the negative side in the Y axis direction.

Next, FIG. 20 is a drawing for explaining an example of raster image data in a case where the correction according to the embodiment is performed. FIG. 20 illustrates raster image data corrected on the basis of (i) read image data that the sensor 425 (see FIG. 2) obtains by reading the pages 111, 112, and 113 of FIG. 19 having images formed thereon and (ii) the mark-attached raster image data. The raster image data 121 indicates raster image data formed on the 1st page. The raster image data 122 indicates raster image data formed on the 2nd page. The raster image data 123 indicates raster image data formed on the 3rd page.

As illustrated in FIG. 20, in the raster image data 121, the positive side in the X axis direction and the positive side in the Y axis direction of the raster image data are expanded so as to correct the expansion-and-contraction on the positive side in the X axis direction and the positive side in the Y axis direction on the page 111 of FIG. 19. In the raster image data 122, the negative side in the X axis direction and the positive side in the Y axis direction of the raster image data are expanded so as to correct the expansion-and-contraction on the negative side in the X axis direction and the positive side in the Y axis direction of the page 112 of FIG. 19. In the raster image data 123, the negative side in the X axis direction and the negative side in the Y axis direction of the raster image data are expanded so as to correct the expansion-and-contraction on the negative side in the X axis direction and the negative side in the Y axis direction on the page 113 of FIG. 19.

Next, FIG. 21 is a drawing for explaining an example of an image forming result in a case where the correction according to the embodiment is performed. FIG. 21 illustrates multiple pages of sheets on which images are formed on the basis of raster image data 121, 122, and 123 of FIG. 20. A page 131 indicates the 1st page, a page 132 indicates the 2nd page, and a page 133 indicates the 3rd page.

As illustrated in FIG. 21, on the page 131, an image obtained by appropriately correcting the expansion-and-contraction of the page 111 on the positive side in the X axis direction and the positive side in the Y axis direction illustrated in FIG. 19 has been obtained. Similarly, on the page 132, an image obtained by appropriately correcting the expansion-and-contraction of the page 112 on the negative side in the X axis direction and the positive side in the Y axis direction illustrated in FIG. 19 has been obtained. Also, similarly, on the page 133, an image obtained by appropriately correcting the expansion-and-contraction of the page 113 the negative side in the X axis direction and the negative side in the Y axis direction illustrated in FIG. 19 has been obtained.

<Effects of Liquid Discharge Apparatus 1>

Next, the effects of the liquid discharge apparatus 1 are explained.

In order to cause ink to adhere to the sheet, in the liquid discharge apparatus 1, the amount of deformation of the sheet (the amount of expansion-and-contraction) is different according to the amount and distribution of ink that is different according to the image, and the shift in position and the deformation of the image may be different according to the image to be formed on the sheet.

For example, in a method for forming a representative pattern image on an image carrier or the like and obtaining the amount of correction from an average value of detection results of the pattern image, the correction accuracy for correcting the shift in position and the deformation of the image, which are different from image to image, may decrease.

In contrast, in the present embodiment, raster image data (i.e., the first image data) is obtained, and mark-attached raster image data (i.e., the second image data) obtained by adding a predetermined figure to the raster image data is generated. Then, corrected data (i.e., the third image data) is generated that is obtained by correcting each page of the raster image data on the basis of (i) the mark-attached raster image data and (ii) read image data obtained by reading the image formed on the sheet based on the mark-attached raster image data, and liquid is discharged onto the recording medium on the basis of the corrected data.

The liquid is discharged onto the sheet on the basis of the third image data that is corrected, for each image, according to the amount of deformation of the sheet, so that even in a case where the amount of deformation of the sheet is different from image to image, the correction accuracy for correcting the image to be formed on the sheet can be secured. By doing so, a high quality image obtained by correcting the shift in position and the deformation of the image can be formed on the sheet.

Also, in the present embodiment, the correcting unit 306 can generate the corrected data on the basis of the mark-attached raster image data, the read image data, and a print job including the raster image data. The correction values are different according to the print condition such as duplex printing or single-sided printing of the print job. Therefore, the correction of the image formed on the sheet can be performed more accurately by generating the corrected data by also using the information about the print job including the raster image data.

Second Embodiment

Next, a liquid discharge apparatus 1a according to the second embodiment is explained. In the second embodiment, the same explanation as the first embodiment is omitted as appropriate.

In the present embodiment, the corrected raster image data obtained by correcting either the raster image data or the mark-attached raster image data by using at least one of (i) the correction values obtained on the basis of the amount of deformation of the sheet or (ii) the correction values defined in advance, so that the number of times the correction values are obtained, through calculation, is reduced, and the computational load of the image processing unit is reduced.

<Example of Functional Configuration of Image Processing Unit 3a>

In this case, FIG. 22 is a block diagram for explaining a functional configuration of an image processing unit 3a including the liquid discharge apparatus 1a. As illustrated in FIG. 22, the image processing unit 3a includes an adjustment value storage unit 307 and a correction value obtaining unit 305a. The functions of the adjustment value storage unit 307 are achieved by the SSD 34, the HDD 35, or the like of FIG. 4.

The adjustment value storage unit 307 stores predetermined data (adjustment values) as the correction values for correcting the mark-attached raster image data. For example, a representative pattern image is formed on a sheet, and an average value of results that the sensor 425 (see FIG. 2) obtains by reading the formed image multiple times is stored as a predetermined correction value.

The correction value obtaining unit 305a can obtain any one of (i) the correction values calculated on the basis of the amount of deformation of the sheet detected by the deformation amount detection unit 304 or (ii) predetermined correction values stored in the adjustment value storage unit 307, and output the obtained correction values or the obtained predetermined correction values to the DFE 2. Which of the correction values or the predetermined correction values the correction value obtaining unit 305a obtains may be set by the user of the liquid discharge apparatus 1a with the operation unit 29 (see FIG. 3) of the DFE 2, or may be determined by the correction value obtaining unit 305a on the basis of the detection result of the deformation amount detection unit 304.

<Actions and Effects of Liquid Discharge Apparatus 1a>

As explained above, in the present embodiment, using any one of the correction values obtained on the basis of the amount of deformation of the sheet or the predetermined correction values, the corrected raster image data obtained by correcting either the raster image data or the mark-attached raster image data is generated. In a case where the deformations of sheets are substantially the same on all of the pages, the correction is performed using the predetermined correction values, and in a case where the deformations of sheets vary from page to page, the correction is performed by using the correction values obtained on the basis of the amount of deformation of the sheet. Therefore, the user's work load for obtaining the correction values can be alleviated.

Third Embodiment

In the present embodiment, the correction according to the embodiment is applied to variable print. In this case, the "variable print" is a method for forming an image by changing the content of the image to be formed on the basis of data. In the variable print, a single page of a sheet includes: a fixed area in which the content is fixed (i.e., the same) on all of the pages; and a variable area in which the content varies from page to page. For example, a print of a recipient address of a direct mail is a typical example of a variable print, in which the area of the recipient address corresponds to the variable area, and the area displaying product information, a catalog, and the like corresponds to a fixed area.

The effects of the liquid discharge apparatus according to the present embodiment are explained with reference to FIG. 23 to FIG. 25. Areas hatched by diagonal lines in FIG. 23 to FIG. 25 indicate the above variable areas, and areas hatched by horizontal lines indicate the above fixed areas.

First, FIG. 23 is a drawing for explaining an example of an ideal variable print result. FIG. 23 illustrates multiple pages of sheets that are printed as variable print. A page 151 indicates the 1st page of the 1st copy. A page 152 indicates the 2nd page of the 1st copy, a page 153 indicates the 1st page of the 2nd copy, a page 154 indicates the 2nd page of the 2nd copy, a page 155 indicates the 1st page of the 3rd copy, and a page 156 indicates the 2nd page of the 3rd copy.

Next, FIG. 24 is a drawing for explaining an example of a variable print result in a case where the correction according to the embodiment is not performed. FIG. 24 illustrates multiple pages of sheets that are printed as variable print. A page 161 indicates the 1st page of the 1st copy, a page 162 indicates the 2nd page of the 1st copy, a page 163 indicates the 1st page of the 2nd copy, a page 164 indicates the 2nd page of the 2nd copy, a page 165 indicates the 1st page of the 3rd copy, and a page 166 indicates the 2nd page of the 3rd copy.

In the variable print, a portion of the page is a variable area. Accordingly, on pages having substantially the same variable area or pages having variable areas that are substantially symmetrical about the center of the sheet, the deformation of the sheets tend to be the same, and as a result, the shifts in position and the deformations of the images may be the same as one another.

In FIG. 24, the variable area on the page 163 is substantially the same as that on the page 161. On the page 164, the variable area is substantially symmetrical with the variable area on the page 163 about the center of the sheet. On the page 165, the variable area is substantially the same as the variable area on the page 161. On the page 166, the variable area is substantially the same as the variable area on the page 162.

Therefore, for the page 161, the page 163, and the page 165, the corrected raster image data obtained by correcting the mark-attached raster image data is generated using the same correction values. For the page 162, the page 164, and the page 166, the corrected raster image data obtained by correcting the mark-attached raster image data is generated using the same correction values. Whether the same correction values are used can be determined by the correction value obtaining unit 305 on the basis of the detection result of the deformation amount detection unit 304 (see FIG. 5).

FIG. 25 is a drawing for explaining an example of a variable print result in a case where the correction according to the embodiment is performed. FIG. 25 illustrates multiple pages printed as variable print. A page 171 indicates the 1st page of the 1st copy, a page 172 indicates the 2nd page of the 1st copy, a page 173 indicates the 1st page of the 2nd copy, a page 174 indicates the 2nd page of the 2nd copy, a page 175 indicates the 1st page of the 3rd copy, and a page 176 indicates the 2nd page of the 3rd copy.

The deformations of sheets vary from page to page, but the shift in position or the deformation, or both of the shift in position and the deformation, of the image formed on the sheet is alleviated due to the correction.

In this manner, in the present embodiment, the image to be formed on the sheet can be corrected in variable print.

Also, in the present embodiment, the correction values that differ from page to page are obtained on the basis of a representative pattern formed on a sheet. This representative pattern is, for example, a pattern of a zip code, an address, and a name when an image of a recipient address of a postal item is formed. In the present embodiment, the pattern of the zip code, the address, and the name is used as a mark for correction, and the correction values that are different for each of multiple pages are obtained. Accordingly, the correction accuracy can be secured in variable print.

Fourth Embodiment

A liquid discharge apparatus 1b according to the fourth embodiment is explained.

Basic deformation, i.e., deformation that occurs when a single image is formed on a single page, can be corrected by applying affine transformation to a two-dimensional array in the X axis and Y axis by geometric transformation. In such a case, the correction values are derived at four points. However, a surface can be corrected with coordinates at three points, and therefore, in a case where two or more images are arranged and formed on a single page, the correction is performed by printing five or more reference marks in the image forming area.

FIG. 26 is a drawing illustrating an example of marks according to the present embodiment. FIG. 27 to FIG. 32 are drawings for explaining correction according to the present embodiment. FIG. 27 is a first example. FIG. 28 illustrates a second example. FIG. 29 illustrates a third example. FIG. 30 illustrates a fourth example. FIG. 31 illustrates a fifth example. FIG. 32 illustrates a sixth example. In each of FIG. 27 to FIG. 32, the X axis and the Y axis are indicated by arrows. In the X direction along the X axis, a direction pointed by the arrow is denoted as +X direction, and a direction opposite to +X direction is denoted as −X direction. Likewise, in the Y direction along the Y axis, a direction pointed by the arrow is denoted as +Y direction, and a direction opposite to +Y direction is denoted as −Y direction.

As illustrated in FIG. 26, marks are provided at four corners of the image, i.e., a point A(0, 0), a point C(200, 0), a point G(0, 200), and a point I(200, 200), and also at the center of the image, i.e., a point E(100, 100).

For example, in a case where four images are arranged on a single page, as illustrated in FIG. 27, marks are formed on the perimeter of each image. Alternatively, two or three images may be arranged on a single page, or five or more images may be arranged on a single page. In a case where two images are arranged on a single page, the mark at the central point E (see FIG. 26) is not formed, and marks at the four corners, i.e., the point A, the point B, the point C, and the point D, are formed. The accuracy of correction can be improved when, using three or more marks in each image, an image "A" in FIG. 27 is corrected with 3 points×2 and an image "B" in FIG. 27 is corrected with 3 points×2. Note that "3 points×2" means that three marks are corrected twice in order to correct a quadrilateral.

As illustrated in FIG. 27 and FIG. 28, when four images are simply arranged on a single page, it can be understood how the respective images, i.e., the image "A" to the image "D", are deformed. The marks are formed at four corners of each of the respective images, i.e., the image "A" to the image "D". In this case, at positions in proximity, the image tends to deform in the same direction. For example, in a case where the center of the sheet is shifted in position in the upper left direction due to expansion-and-contraction, the lower right (on +X direction side and on −Y direction side) of the image "A", the lower left (on −X direction side and on −Y direction side) of the image "B", the upper right (on +X direction side and on +Y direction side) of the image "C", and the upper left (on −X direction side and on +Y direction side) of the image "D" are close to each other in position, and accordingly, the shifts in position of the same tendency are likely to occur at these positions.

Also, as illustrated in FIG. 29 and FIG. 30, if the expansion-and-contraction at positions in proximity have the same tendency, these marks in proximity can be unified.

The mark positions other than the four corners change depending on the imposition. As illustrated in FIG. 31, in a case of four-image imposition, a setting (arrangement) may be made in an area 311 extending in the main scanning direction (i.e., the X direction) and an area 312 extending in the sub-scanning direction (i.e., the Y direction).

As illustrated in FIG. 32, in a case of six-image imposition, a setting may be made in an area 321 extending in the main scanning direction and an area 322 and an area 323 extending in the sub-scanning direction. In a case where areas are arranged in three columns, setting is made in areas other than the two areas. In a case where areas are arranged in two rows, setting is made in areas other than the one area.

Positions where marks ("T" shaped marks, "L" shaped marks, and "+" shaped marks) are set, other than those at the four corners, are configured to be outside of images 313 (areas surrounded by broken lines) or images 324 (areas surrounded by broken lines) of trim marks. These marks are automatically arranged on the basis of the images to be formed on the sheet and the coordinates of the marks at the four corners. The images 313 and the images 324 include images to be formed on the sheet in the print job. The images to be formed on the sheet include trim marks. The outermost portions of the images 313 and the images 324 are border lines of the images. In a case of automatic arrangement, the marks are arranged on the basis of the border lines of the images arranged. In a case where, e.g., the four corners are likely to extend out of the marks, the mark position may be designated by the user on a user interface (UI) screen. When the marks are unified, the number of times the user designates an area to be cut decreases, which improves the usability or reduces the processing load.

<Operation Example of Liquid Discharge Apparatus 1b>

FIG. 33 is a flowchart illustrating an example of correction value calculation operation of the liquid discharge apparatus 1b.

First, in step S331, the liquid discharge apparatus 1b determines a reference position such as a mark position.

Next, in step S332, the correction values of multiple images are calculated on the basis of the marks formed at the reference position.

In this manner, the liquid discharge apparatus 1b can obtain the correction values.

FIG. 34 is a flowchart illustrating an example of detailed operation of correction value calculation by the liquid discharge apparatus 1b.

First, in step S341, the liquid discharge apparatus 1b sets marks.

Next, in step S342, the liquid discharge apparatus 1b generates the second data by adding, to the first image data, data corresponding to the marks.

Next, in step S343, the printer 4 of the liquid discharge apparatus 1b forms an image on a sheet on the basis of the second image data.

Next, in step S344, the sensor 425 of the liquid discharge apparatus 1b reads the image formed on the sheet by the printer 4, and calculates the positions of the marks on the sheet on the basis of the read image data.

Next, in step S345, the liquid discharge apparatus 1b calculates the correction values on the basis of the positions of the marks.

Next, in step S346, the liquid discharge apparatus 1b stores the calculated correction values to the correction value storage unit 21.

In this manner, the liquid discharge apparatus 1b can calculate and store the correction values.

The liquid discharge apparatus 1b can improve the accuracy in position of image formation by using the correction values stored in the correction value storage unit 21.

In this case, the main scanning position correction value for correcting the drawing position in a direction perpendicular to the conveying direction (main scanning direction) of the image, and the sub-scanning position correction value is a correction value for correcting the drawing position in the conveying direction (sub-scanning direction).

The main scanning magnification error correction value is a correction value for correcting the magnification of the image in the main scanning direction, and the sub-scanning magnification error correction value is a correction value for correcting the magnification of the image in the sub-scanning direction.

The main scanning left-side deviation amount correction value, the main scanning right-side deviation amount correction value, the sub-scanning top-side deviation amount correction value, and the sub-scanning bottom-side deviation amount correction value are correction values for correcting the distortions in the upward (top), downward (bottom), left, and right directions (+X direction side, −X direction side, +Y direction side, −Y direction side), respectively, of the image.

Even in partial positioning, the test printing, the position correction setting, and the method for calculating the correction value are used. Even in partial positioning, data of the correction values is stored for each of multiple images on respective pages of a single print job, and also the correction values may be stored for each of the sheet types. The liquid discharge apparatus 1b can commonly apply the stored correction values to all of multiple pages in multiple print jobs.

Although the present invention has been hereinabove explained on the basis of the embodiments and examples, the present invention is not limited to the above embodiments and examples. Various additions, changes, modifications, alternations, and the like can be made to the above embodiments and examples without deviating from the gist of the present invention.

For example, in the above embodiments, the image forming apparatus has been explained as the line scanning ink jet type image forming apparatus, but the embodiments are not limited thereto. The embodiments can also be applied to a serial scanning ink jet type image forming apparatus, and substantially the same effects as those achieved by the liquid discharge apparatus 1 explained above can be achieved.

Also, the embodiments include a control method for controlling a liquid discharge apparatus. For example, the control method for controlling the liquid discharge apparatus is a control method for controlling a liquid discharge apparatus for forming an image on a recording medium, the control method including obtaining first image data, generating second image data by adding a predetermined figure to the first image data, generating third image data obtained by correcting any one of the first image data or the second image data, based on both the second image data and read image data obtained by reading an image formed on the recording medium based on the second image data, and discharging liquid onto the recording medium, based on any one of the second image data or the third image data. With the control method for controlling the liquid discharge apparatus, substantially the same effects as those achieved by the liquid discharge apparatus 1 explained above can be achieved.

The embodiments also include a recording medium. For example, the recording medium stores instructions for causing a liquid discharge apparatus to execute processing including obtaining first image data, generating second image data by adding a predetermined figure to the first image data, generating third image data obtained by correcting any one of the first image data or the second image data, based on the second image data and read image data obtained by reading an image formed on the recording medium based on the second image data, and discharging liquid onto the recording medium, based on any one of the second image data or the third image data. With the recording medium, substantially the same effects as those achieved by the liquid discharge apparatus 1 explained above can be achieved.

Further, the functions of the embodiments described above may also be implemented by one or more processing circuits. Here, it is assumed that "processing circuitry" includes processors programmed to perform each function by software, such as processors implemented in electronic circuits, devices designed to perform each function as described above, such as ASICs (Application Specific Integrated Circuit), DSPs (digital signal processors), FPGAs (field programmable gate arrays), and conventional circuit modules.

REFERENCE SIGNS LIST 1 liquid discharge apparatus
2 DFE
21 correction value storage unit
3 image processing unit (example of image processing apparatus)
301 first image obtaining unit
302 second image generating unit
303 read image obtaining unit
304 deformation amount detection unit
305 correction value obtaining unit
306 correcting unit
307 adjustment value storage unit
4 printer
42 print unit
423 ink discharging unit (example of liquid discharging unit)
425 sensor (example of reading unit)
5 PC
6 printed matter
95a, 95b mark (example of predetermined figure)

The invention claimed is:

1. A liquid discharge apparatus for image forming on a recording medium, the liquid discharge apparatus comprising:
   first image obtaining circuitry configured to obtain first image data for a trial printing;
   second image generating circuitry configured to generate second image data for the trial printing by adding predetermined figure data of a predetermined figure to the first image data;
   correcting circuitry configured to generate third image data for a production printing by correcting, for each of pages, the first image data based on both the second image data and read image data obtained by reading an image formed on the recording medium based on the second image data; and
   a liquid discharger configured to discharge liquid onto the recording medium based on the third image data, wherein
   the correcting circuitry generates the third image data by correcting the first image data by using a correction value calculated by comparing a position of the predetermined figure in the second image data with a position of the predetermined figure in the read image data.

2. The liquid discharge apparatus according to claim 1, further comprising:
   reading circuitry configured to generate the read image data by reading the image formed on the recording medium based on the second image data, wherein
   the correcting circuitry generates the third image data based on both the second image data and the read image data generated by the reading circuitry.

3. The liquid discharge apparatus according to claim 1, wherein in a case that images are formed on both a first surface of the recording medium and a second surface of the recording medium opposite of the first surface, the liquid discharger is configured to
   discharge, based on the first image data or the second image data, the liquid onto the first surface, and
   discharge, based on the third image data, the liquid onto the second surface on the opposite side from the first surface of the recording medium of which the first surface has been read.

4. The liquid discharge apparatus according to claim 3, wherein the second surface is a surface on the opposite side from the first surface of the recording medium of which the first surface has been read.

5. A liquid discharge apparatus for image forming on a recording medium, the liquid discharge apparatus comprising:
   first image obtaining circuitry configured to obtain first image data for a trial printing;
   second image generating circuitry configured to generate second image data for the trial printing by adding predetermined figure data to the first image data;
   correcting circuitry configured to generate third image data for a production printing by correcting, for each of pages, the first image data based on both the second image data and read image data obtained by reading an image formed on the recording medium based on the second image data;
   a liquid discharger configured to discharge liquid onto the recording medium based on the third image data; and
   correction value obtaining circuitry configured to obtain a correction value for correcting either the first image data or the second image data based on an amount of deformation of the recording medium detected from the second image data and the read image data, wherein
   the correcting circuitry generates the third image data based on the correction value.

6. The liquid discharge apparatus according to claim 5, further comprising:
   a memory configured to store the correction value, wherein
   the correcting circuitry generates the third image data based on the correction value obtained from the memory.

7. The liquid discharge apparatus according to claim 5, wherein in a case that images are formed on a plurality of pages, the correction value obtaining circuitry obtains correction values that are different among the plurality of pages.

8. The liquid discharge apparatus according to claim 7, wherein the correction value obtaining circuitry obtains correction values that are different among the plurality of pages based on a representative pattern formed on the recording medium.

9. The liquid discharge apparatus according to claim 5, wherein the correction value obtaining circuitry obtains either the correction value obtained based on the amount of deformation or a predetermined correction value.

10. The liquid discharge apparatus according to claim 1, wherein
the liquid discharge apparatus is configured to
generate, as the trial printing of a print job, the second image data based on the first image data, and
obtain correction values for respective pages of the print job based on both the second image data and the read image data obtained by reading the image formed on the recording medium based on the second image data, and
when production printing of the print job is performed,
the third image data obtained by correcting the respective pages by using the correction values for the respective pages is generated, and
the liquid is discharged onto the recording medium based on the third image data.

11. The liquid discharge apparatus according to claim 1, wherein in a case that the liquid discharge apparatus performs duplex printing in production printing of a print job:
for a first surface of at least one of the pages, the liquid discharge apparatus generates the second image data of the first surface based on the first image data, and generates the third image data of the first surface obtained by correcting the second image data of the first surface by using the correction value obtained based on data of an image formed on the second surface in trial printing,
for a second surface of at least one of the pages, the liquid discharge apparatus generates the third image data of the second surface from the first image data of the second surface based on the read image data obtained by reading the image formed on the recording medium based on the second image data of the first surface, and
the liquid discharge apparatus discharges the liquid onto the recording medium, as the production printing, based on the third image data of the first surface and the third image data of the second surface.

12. The liquid discharge apparatus according to claim 1, wherein in a case that the liquid discharge apparatus performs duplex printing in production printing of a print job:
for a first surface of at least one of the pages, the liquid discharge apparatus generates the third image data of the first surface by using the correction value obtained based on data of an image formed on the first surface based on the first image data in trial printing,
for a second surface of at least one of the pages, the liquid discharge apparatus generates the third image data of the second surface obtained by correcting the first image data of the second surface based on read image data obtained by reading the image formed on the recording medium based on the first image data of the first surface, and
the liquid discharge apparatus discharges the liquid onto the recording medium as the production printing, based on the third image data of the first surface and the third image data of the second surface.

13. A control method for controlling a liquid discharge apparatus for image forming on a recording medium, the control method comprising:
obtaining first image data for a trial printing;
generating second image data for the trial printing by adding predetermined figure data of a predetermined figure to the first image data;
generating third image data for a production printing by correcting any one of the first image data or the second image data based on both the second image data and read image data obtained by reading an image formed on the recording medium based on the second image data;
discharging liquid onto the recording medium based on any one of the second image data or the third image data; and
generating the third image data by correcting the first image data by using a correction value calculated by comparing a position of the predetermined figure in the second image data with a position of the predetermined figure in the read image data.

* * * * *